(12) United States Patent
Yang et al.

(10) Patent No.: US 11,544,245 B2
(45) Date of Patent: Jan. 3, 2023

(54) TRANSACTION PROCESSING METHOD, APPARATUS, AND DEVICE AND COMPUTER STORAGE MEDIUM

(71) Applicant: TENCENT TECHNOLOGY (SHENZHEN) COMPANY LIMITED, Shenzhen (CN)

(72) Inventors: Jia Yang, Shenzhen (CN); Qiang Fei, Shenzhen (CN); Ningguo Chen, Shenzhen (CN); Dezhi Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 47 days.

(21) Appl. No.: 17/170,207

(22) Filed: Feb. 8, 2021

(65) Prior Publication Data

US 2021/0165810 A1   Jun. 3, 2021

Related U.S. Application Data

(63) Continuation of application No. PCT/CN2020/121033, filed on Oct. 15, 2020.

(30) Foreign Application Priority Data

Dec. 3, 2019   (CN) .......................... 201911223449.3

(51) Int. Cl.
  *G06F 16/23*   (2019.01)
(52) U.S. Cl.
  CPC ...... *G06F 16/2315* (2019.01); *G06F 16/2379* (2019.01)
(58) Field of Classification Search
  CPC .................................................. G06F 16/2315
  See application file for complete search history.

(56) References Cited

U.S. PATENT DOCUMENTS

| | | | | |
|---|---|---|---|---|
| 6,457,065 B1 * | 9/2002 | Rich | ................... | G06F 16/2379 |
| | | | | 719/329 |
| 2002/0194142 A1 * | 12/2002 | Coffey | ............... | G06Q 20/1085 |
| | | | | 705/43 |

(Continued)

FOREIGN PATENT DOCUMENTS

| CN | 102073540 A | 5/2011 |
|---|---|---|
| CN | 103647834 A | 3/2014 |

(Continued)

OTHER PUBLICATIONS

The World Intellectual Property Organization (WIPO) International Search Report for PCT/CN2020/121033 dated Jan. 8, 2021 10 Pages (including translation).

(Continued)

*Primary Examiner* — James Trujillo
*Assistant Examiner* — Michal Bogacki
(74) *Attorney, Agent, or Firm* — Anova Law Group PLLC

(57) ABSTRACT

A transaction processing method includes: dividing a to-be-processed transaction obtained from a database into at least two subtransactions; dividing each subtransaction into N parts with an association relationship; processing the N parts of each subtransaction based on the association relationship, to obtain a processing result of a lastly executed part of the N parts; determining, upon detecting an abnormal subtransaction based on the processing result, a processing policy matching an abnormality reason of the abnormal subtransaction; and processing the abnormal subtransaction by using the processing policy, to obtain a final processing result of the to-be-processed transaction.

20 Claims, 10 Drawing Sheets

(56) References Cited

U.S. PATENT DOCUMENTS

| | | | | |
|---|---|---|---|---|
| 2008/0228690 | A1* | 9/2008 | Horovitz | H04L 69/163 |
| | | | | 706/48 |
| 2012/0066189 | A1* | 3/2012 | Kumar | G06F 16/40 |
| | | | | 707/703 |
| 2013/0080480 | A1* | 3/2013 | Mao | H04L 67/10 |
| | | | | 707/E17.044 |
| 2014/0108367 | A1 | 4/2014 | Kim et al. | |
| 2019/0227723 | A1 | 7/2019 | Cohen et al. | |
| 2019/0314080 | A1* | 10/2019 | Prisco | A61B 17/32002 |

FOREIGN PATENT DOCUMENTS

| | | |
|---|---|---|
| CN | 104317850 A | 1/2015 |
| CN | 105988865 A | 10/2016 |
| CN | 108415757 A | 8/2018 |
| CN | 110231980 A | 9/2019 |
| CN | 110990182 A | 4/2020 |
| JP | H06223007 A | 8/1994 |
| JP | H06243072 A | 9/1994 |
| JP | H10232809 A | 9/1998 |
| KR | 20140047448 A | 4/2014 |
| KR | 20190088636 A | 7/2019 |

OTHER PUBLICATIONS

The State Intellectual Property Office of the People's Republic of China (SIPO) Office Action 1 for 201911223449.3 dated Dec. 1, 2020 9 Pages (including translation).

H. Garcia-Molina et al., "Sagas," ACM Sigmod Record, 16(3), 1987, pp. 249-259. 11 pages.

The Japan Patent Office (JPO) Notification of Reasons for Refusal for Application No. 2021-509740 and Translation dated May 17, 2022 12 Pages.

Korean Intellectual Property Office (KIPO) The Office Action For KR Application No. 10-2021-7002929 dated Sep. 6, 2022 10 Pages (Translation Included).

* cited by examiner

TRANSACTION PROCESSING METHOD, APPARATUS, AND DEVICE AND COMPUTER STORAGE MEDIUM

CROSS-REFERENCES TO RELATED APPLICATIONS

This application is a continuation application of PCT Patent Application No. PCT/CN2020/121033, filed on Oct. 15, 2020, which claims priority to Chinese Patent Application No. 201911223449.3, filed on Dec. 3, 2019, the entire contents of both of which are incorporated herein by reference.

FIELD OF THE TECHNOLOGY

The present disclosure relates to the field of databases, and in particular, to a transaction processing method, apparatus, and device and a computer storage medium.

BACKGROUND OF THE DISCLOSURE

In existing database technology, before a data operation on a transaction A is confirmed (commit) or reversed (rollback), another transaction cannot see data modification made by the data operation on the transaction A. If transaction A is a long transaction (also called a long-living transaction or a long-running transaction, and often includes multiple subtransactions) and is not committed, a processing request for operating the same resource may be blocked or expired. As a result, completion of the processing request relies on commitment of transaction A or commitment of a subtransaction of transaction A that involves the same resource in a database, and consequently overall service performance is limited by a processing capability of a standalone database and processing efficiency is relatively low.

SUMMARY

Embodiments of the present disclosure provide a transaction processing method, apparatus, and device and a computer storage medium, to automatically process an abnormal subtransaction by using a matched processing policy, thereby improving fault tolerance and a transaction processing capability.

The technical solutions in the embodiments of the present disclosure are implemented as follows:

According to one aspect, an embodiment of the present disclosure provides a transaction processing method, the method being applied to a computing device such as a transaction processing device. The method includes: dividing a to-be-processed transaction obtained from a database into at least two subtransactions; dividing each subtransaction into N parts with an association relationship, N being an integer greater than 1; processing the N parts of each subtransaction based on the association relationship, to obtain a processing result of a lastly executed part of the N parts; determining, upon detecting an abnormal subtransaction based on the processing result, a processing policy matching an abnormality reason of the abnormal subtransaction; and processing the abnormal subtransaction by using the processing policy, to obtain a final processing result of the to-be-processed transaction.

According to another aspect, an embodiment of the present disclosure provides a transaction processing device, including: a memory, configured to store an executable instruction; and a processor, configured to perform: dividing a to-be-processed transaction obtained from a database into at least two subtransactions; dividing each subtransaction into N parts with an association relationship; processing the N parts of each subtransaction based on the association relationship, to obtain a processing result of a lastly executed part of the N parts; determining, upon detecting an abnormal subtransaction based on the processing result, a processing policy matching an abnormality reason of the abnormal subtransaction; and processing the abnormal subtransaction by using the processing policy, to obtain a final processing result of the to-be-processed transaction.

According to another aspect, an embodiment of the present disclosure provides a storage medium (a non-transitory storage medium), storing an executable instruction. The executable instruction, when being executed, cause a processor to perform: dividing a to-be-processed transaction obtained from a database into at least two subtransactions; dividing each subtransaction into N parts with an association relationship; processing the N parts of each subtransaction based on the association relationship, to obtain a processing result of a lastly executed part of the N parts; determining, upon detecting an abnormal subtransaction based on the processing result, a processing policy matching an abnormality reason of the abnormal subtransaction; and processing the abnormal subtransaction by using the processing policy, to obtain a final processing result of the to-be-processed transaction.

The embodiments of the present disclosure have the following beneficial effects: For the to-be-processed transaction, a subtransaction is divided into a plurality of parts based on a network interface to which the subtransaction belongs, and each part is processed, to resolve a problem that overall service performance is limited by a processing capacity of a standalone database. For the abnormal subtransaction whose processing result is abnormal, the matched processing policy is selected based on the abnormality reason to process the abnormal subtransaction, to obtain the final processing result. In this way, the abnormal subtransaction is automatically processed by using the matched processing policy, thereby improving fault tolerance and a transaction processing capability.

BRIEF DESCRIPTION OF THE DRAWINGS

The accompanying drawings herein, which are incorporated into the specification and constitute a part of this specification, illustrate embodiments consistent with the present disclosure and, together with the specification, serve to explain the technical solutions of the present disclosure.

DESCRIPTION OF EMBODIMENTS

Figure 1:
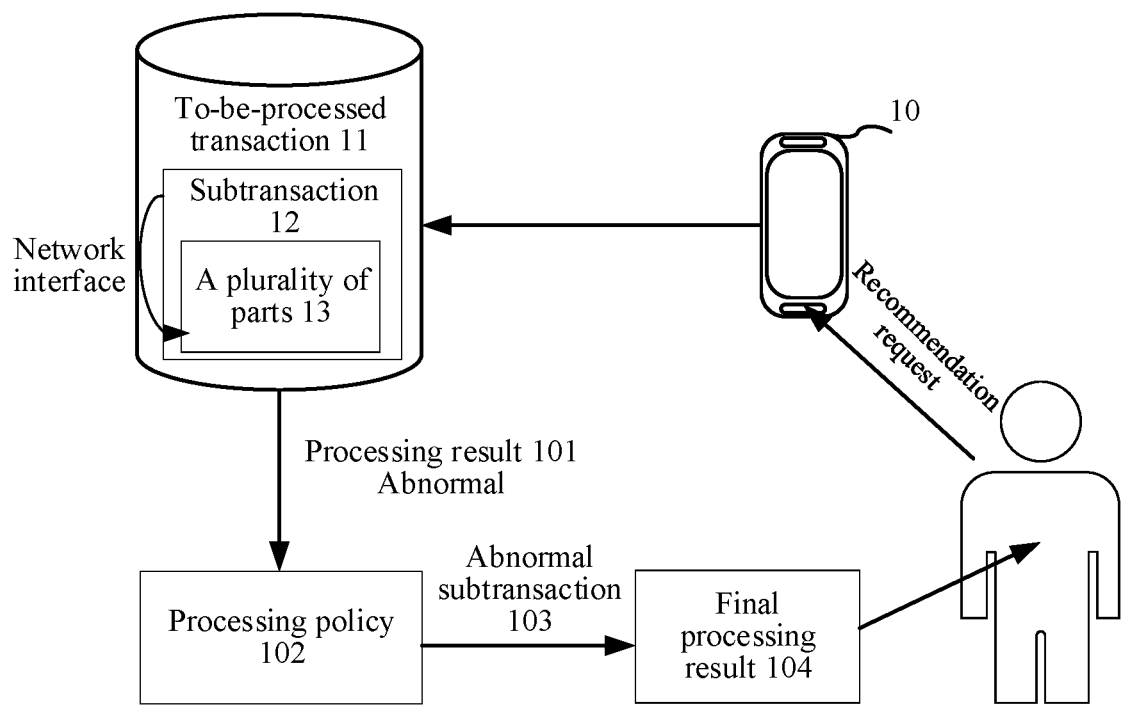
FIG. 1 is an optional schematic architectural diagram of a transaction processing system according to an embodiment of the present disclosure.

To make objectives, technical solutions, and advantages of the present disclosure clearer, the following further describes the present disclosure in detail with reference to the accompanying drawings, and the described embodiments cannot be considered as limiting of the present disclosure. All other embodiments obtained by a person of ordinary skill in the art without creative efforts shall fall within the protection scope of the present disclosure.

In the following descriptions, "some embodiments" are involved, which describes subsets of all possible embodiments. However, it may be understood that, the "some embodiments" may be same subsets or different subsets of the all possible embodiments, and may be combined with each other without conflict.

In the following descriptions, involved terms "first/second/third" are only intended to distinguish between similar objects rather than describe a specific order of the objects. It may be understood that, if it is permitted, a specific order or sequence of the "first/second/third" may be exchanged, to make the embodiments of the present disclosure described in some embodiments may be implemented in other order than the order shown or described herein.

Unless otherwise defined, meanings of all technical and scientific terms used in this specification are the same as that usually understood by a person skilled in the technical field to which the present disclosure belongs. Terms used in the specification are merely intended to describe objectives of the embodiments of the present disclosure, but are not intended to limit the present disclosure.

Before the present disclosure is further described in detail, a description is made on nouns and terms involved in the embodiments of the present disclosure, and the nouns and terms involved in the embodiments of the present disclosure are applicable to the following explanations.

1) ACID attributes: A transaction has four attributes: atomicity, consistency, isolation, and durability, which are referred to as ACID attributes of the transaction for short.

2) Long transaction: A transaction that cannot be finished within a very long time is a long transaction. In a database, a transaction that runs for more than 6 seconds is considered as a long transaction. In Informix, a transaction that occupies more than a particular proportion of entire logical log space (a percentage that the transaction occupies in the entire logical log space exceeds a value specified by a parameter "long-transaction high-watermark") is referred to as a "long transaction".

3) Publish-subscribe (PubSub) mechanism: Messaging mode introduction is a classic messaging mode with a long history. A publish-subscribe mode defines a one-to-many dependency relationship. A plurality of subscriber objects listen to a topic object at the same time. When changing its status, the topic object notifies all the subscriber objects, so that the subscriber objects can automatically update their own statuses. Dividing a system into a series of cooperative categories has a very bad side effect, that is, consistency between corresponding objects needs to be maintained, which brings inconvenience to all maintenance, extension, and reuse. When an object needs to change other objects while changing itself and a specific quantity of the objects that need to be changed is unknown, the publish-subscribe mode may be used.

4) Cluster server (Broker): This is a generic term for one or more servers in a cluster. The broker has no replica mechanism. Once the broker breaks down, messages of the broker are all unavailable. The broker does not store a status of a subscriber, and instead the subscriber stores the status.

5) Bookkeeper is a service framework providing persistent storage of a log entry stream and is especially suitable for storing a log stream, and a classic application is a persistent framework for a message queue.

6) Write-Ahead Logging: A transaction log can help improve event efficiency. When modifying target data, a storage engine needs to modify only an internal memory copy thereof by using an transaction log and then record a modification behavior in a transaction log persistent in a hard disk, and does not need to make modified data persistent in a magnetic disk every time. Because an transaction log is added, a log writing operation is sequential I/O in a small area of a magnetic disk. Unlike random I/O, a magnetic head does not need to be moved at a plurality of locations of the magnetic disk. A manner of using an transaction log is much faster. After a transaction log is persistent, modified data in an internal memory may be slowly flushed back to the magnetic disk in the background.

7) Blockchain: An encrypted chain transaction storage structure formed by blocks.

8) Blockchain network: A set of a series of nodes in which a new block is included in a blockchain through consensus.

9) A cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries all requires strong system support and this can be implemented only through cloud computing.

10) A database (DB) may be simply considered as an electronic file cabinet, that is, a place for storing an electronic file. A user may perform an operation such as add, query, update, or delete data in the file. The so-called "database" is a data set that is stored together in a particular manner and can be shared by a plurality of users, has as less redundancy as possible, and is independent of an application.

11) A database management system (DBMS) is a computer software system designed to manage a database, and generally has basic functions such as storage, capturing, security guarantee, and backup. Database management systems may be classified based on database models supported by the database management systems, for example, a relational type and an extensible markup language (XML), or may be classified based on supported computer types, for example, a server cluster and a mobile phone, or may be classified based on used query languages, for example, structured query language (SQL) and XQuery, or may be classified based on performance impulse emphasis, for example, a maximum scale and a highest running speed, and the like. Regardless of a classification manner, some DBMSs can operate across different categories, for example, support a plurality of query languages at the same time.

In the related art, because commitment of a subtransaction depends on a local transaction of a database, overall service performance is limited by a processing capability of a standalone database. A status of a long transaction and a service database operation need to be committed as a local database transaction. Therefore, this intrudes on a service database. In addition, usage of some operations for which a compensation transaction cannot be provided is limited to some extent.

Based on this, the embodiments of the present disclosure provide a transaction processing method, apparatus, and device and a computer storage medium (a non-transient storage medium). In a scenario in which a long transaction needs to be processed, first, an obtained to-be-processed transaction is divided into at least two subtransactions; then, each subtransaction is divided into a plurality of parts with an association relationship based on a network interface to which the subtransaction belongs; the plurality of parts of each subtransaction is processed based on the association relationship, to obtain a processing result of a lastly executed part of the plurality of parts; finally, a processing policy matching an abnormality reason of the abnormal subtransaction is determined upon detecting an abnormal subtransaction based on the processing result; and the abnormal subtransaction is processed by using the processing policy, to obtain a final processing result of the to-be-processed transaction. In this way, for the to-be-processed transaction, a subtransaction is divided into a plurality of parts based on a network interface to which the subtransaction belongs, to resolve a problem that overall service performance is limited by a processing capacity of a standalone database. Then, each part is processed. For the abnormal subtransaction whose processing result is abnormal, the matched processing policy is selected based on the abnormality reason to process the abnormal subtransaction, to obtain the final processing result. In this way, the abnormal subtransaction is automatically processed by using the matched processing policy, thereby improving fault tolerance and a transaction processing capability.

The following describes an exemplary application of the transaction processing device provided in the embodiments of the present disclosure. The device provided in the embodiments of the present disclosure may be implemented as various types of user devices such as a notebook computer, a tablet computer, a desktop computer, a set-top box, or a mobile device (for example, a mobile phone, a portable music player, a personal digital assistant, a dedicated message device, or a portable game device), or may be implemented as a server. The following describes an exemplary application in which the device is implemented as a device or a server. The server may be an independent physical server, or may be a server cluster including a plurality of physical servers or a distributed system, or may be a cloud server that provides a basic cloud computing service such as a cloud service, a cloud database, cloud computing, a cloud function, cloud storage, a network service, cloud communication, a middleware service, a domain name service, a security service, a CDN, or a big data and artificial intelligence platform. The terminal may be a smart phone, a tablet computer, a notebook computer, a desktop computer, a smart speaker, a smart watch, or the like, but is not limited thereto. The terminal and the server may be directly or indirectly connected through wired or wireless communication. This is not limited herein in the present disclosure.

Referring to FIG. 1, FIG. 1 is an optional schematic architectural diagram of a transaction processing system according to an embodiment of the present disclosure, and shows an exemplary application. First, when a transaction processing request sent by a terminal 10 is received, a to-be-processed transaction 11 specified by the transaction processing request is divided into a plurality of subtransactions 12. Then, each subtransaction is also divided into a plurality of associated parts 13 based on a network interface to which the subtransaction belongs. Subsequently, the plurality of parts 13 are sequentially processed based on the association relationship between the plurality of parts, to obtain a processing result 101 of the lastly executed part of the plurality of parts 13. If the processing result 101 is abnormal, a matched processing policy 102 is determined based on an abnormality reason. Finally, an abnormal subtransaction 103 is processed by using the processing policy, to obtain a final processing result 104 of the to-be-processed transaction 11. In this way, a subtransaction is divided into a plurality of parts based on a network interface to which the subtransaction belongs, and each part is processed, to resolve a problem that overall service performance is limited by a processing capacity of a standalone database. For the abnormal subtransaction whose processing result is abnormal, the matched processing policy is selected based on the abnormality reason to process the abnormal subtransaction, to obtain the final processing result. In this way, the abnormal subtransaction is automatically processed by using the matched processing policy, thereby improving fault tolerance and a transaction processing capability.

Figure 2A:
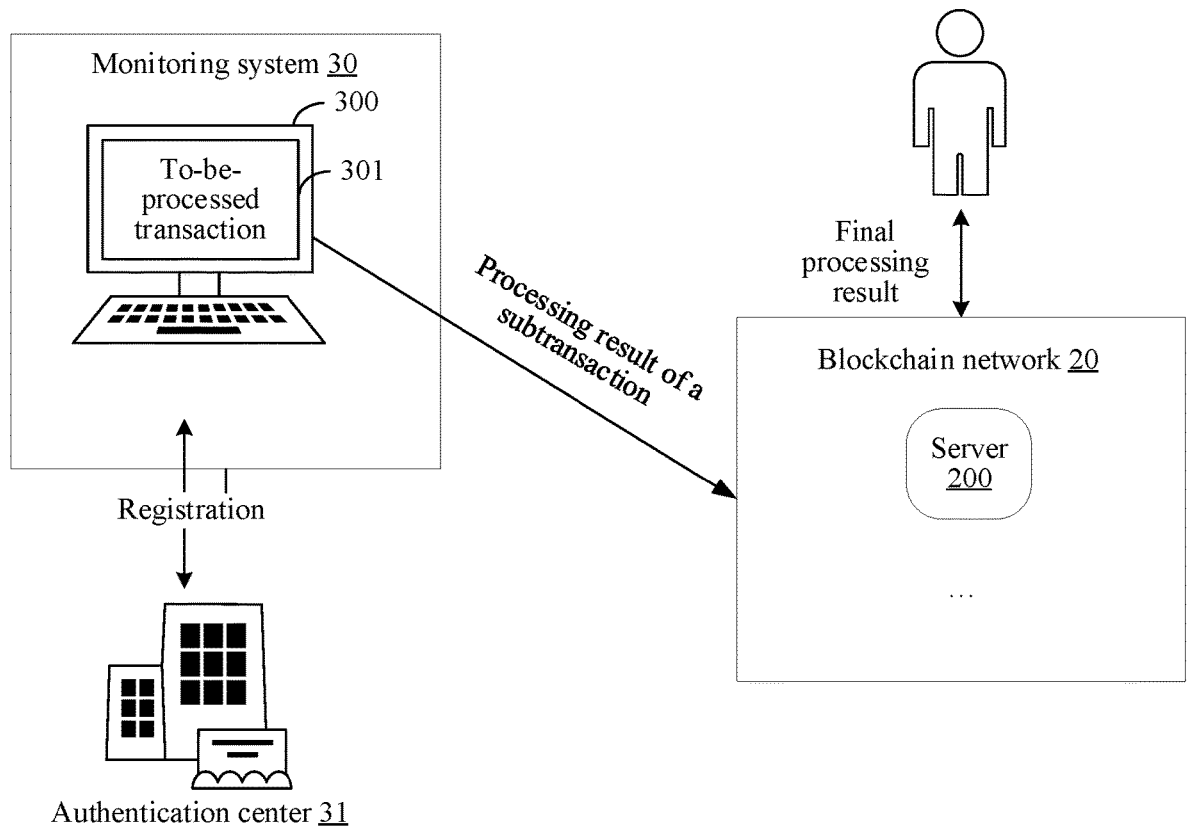
FIG. 2A is another optional schematic architectural diagram of a transaction processing system according to an embodiment of the present disclosure.

Referring to FIG. 2A, FIG. 2A is another optional schematic architectural diagram of a transaction processing system according to an embodiment of the present disclosure. The transaction processing system includes a blockchain network 20 (for example, showing a server 200 as a native node) and a monitoring system 30 (for example, showing a device 300 and a graphical interface 301 thereof that belong to the monitoring system 30), which are separately described below.

Types of the blockchain network 20 are flexible, for example, may be any one of a public blockchain, a private blockchain, or a consortium blockchain. The public blockchain is used as an example, and an electronic device, for example, user equipment and a server of any service entity can access the blockchain network 20 without authorization. The consortium blockchain is used as an example, and after a service entity is authorized, an electronic device (for example, a device/a server) of the service entity can access the blockchain network 20 and then becomes a special node, that is, a client node in the blockchain network 20.

The client node may provide only a function of supporting a service entity to initiate a transaction (for example, used for storing data on an upper chain or querying data on a chain). For functions of the native node of the blockchain network 20, for example, a sorting function, a consensus service, and a ledger function described below, the client node may implement the functions by default or selectively (for example, depending on a specific service requirement of the service entity). Therefore, data and service processing logic of the service entity may be migrated to the blockchain network 20 to the greatest extent, and data and service processing processes are trustable and traceable through the blockchain network 20.

The blockchain network 20 receives a transaction committed by a client node (for example, the device 300 belonging to the monitoring system 30 shown in FIG. 2A) of a service entity (for example, the monitoring system 30 shown in FIG. 2A), executes the transaction to update or query a ledger, and displays various intermediate results or final results of the executed transaction on a user interface of the device (for example, the graphical interface 301 of the device 300).

The following uses an example in which the monitoring system accesses the blockchain network to implement an upper chain of transaction processing, to describe an exemplary application of the blockchain network.

The device 300 of the monitoring system 30 accesses the blockchain network 20 and becomes a client node of the blockchain network 20. The device 300 obtains a to-be-processed transaction by using a sensor, and divides the to-be-processed transaction into at least two subtransactions. Then, each subtransaction is divided into a plurality of parts with an association relationship based on a network interface to which the subtransaction belongs. In addition, the plurality of parts of the subtransaction are processed based on the association relationship, to obtain a processing result of a lastly executed part. Finally, if the processing result shows that there is an abnormal subtransaction, a processing policy matching an abnormality reason is determined. The abnormal subtransaction is processed by using the processing policy, to obtain a final processing result of the to-be-processed transaction. Moreover, the final processing result is transferred to the server 200 in the blockchain network 20 or stored in the device 300. When upload logic has been deployed for the device 300 or a user performs an operation, the device 300 generates, based on the to-be-processed transaction/a synchronization time query request, a transaction corresponding to an update operation/a query operation, and specifies, in the transaction, a smart contract that needs to be invoked to implement the update operation/query operation, and a parameter transferred to the smart contract. The transaction further carries a digital signature (for example, obtained by encrypting a digest of the transaction by using a private key in a digital certificate of the monitoring system 30) signed by the monitoring system 30. The transaction is broadcasted to the blockchain network 20. The digital certificate may be obtained through registration with an authentication center 31 by the monitoring system 30.

When receiving the transaction, the native node such as the server 200 in the blockchain network 20 attempts to verify the digital signature carried by the transaction. After the digital signature has been verified, it is determined whether the monitoring system 30 has transaction authority based on an identity of the monitoring system 30 that is carried in the transaction. Any verification judgment in the digital signature verification and authority verification may lead to a transaction failure. After verification succeeds, a digital signature (for example, obtained by encrypting the digest of the transaction by using a private key of the native node) of the native node is signed, and the transaction continues to be broadcasted in the blockchain network 20.

After receiving the transaction that has been verified, a node with the sorting function in the blockchain network 20 fills the transaction into a new block, and broadcasts the transaction to a node providing the consensus service in the blockchain network 20.

The node providing the consensus service in the blockchain network 20 performs a consensus process on the new block to reach a consensus, and a node providing the ledger function adds the new block to the end of the blockchain and performs the transaction in the new block: for a transaction for committing a processing result of a to-be-processed transaction, a key-value pair corresponding to the to-be-processed transaction is updated in a state database; and for a transaction for querying a synchronization time, a key-value pair corresponding to the synchronization time is queried from a state database and a query result is returned, where the obtained synchronization time may be displayed on the graphical interface 301 of the device 300.

The native node in the blockchain network 20 may read the to-be-processed transaction from the blockchain and display the to-be-processed transaction on a monitoring page of the native node. The native node may alternatively process the to-be-processed transaction by using the to-be-processed transaction stored in the blockchain. For example, a subtransaction is divided into a plurality of parts based on a network interface to which the subtransaction belongs, to resolve a problem that overall service performance is limited by a processing capacity of a standalone database. For the abnormal subtransaction whose processing result is abnormal, the matched processing policy is selected based on the abnormality reason to process the abnormal subtransaction, to obtain the final processing result. In this way, the abnormal subtransaction is automatically processed by using the matched processing policy, thereby improving fault tolerance and a transaction processing capability.

In an actual application, different functions may be set for different native nodes of the blockchain network 20. For example, the server 200 is set to have a transaction processing function and an accounting function. For example, a subtransaction is divided into a plurality of parts based on a network interface to which the subtransaction belongs. each part is processed and an abnormal subtransaction whose processing result is abnormal is determined. Then, a matched processing policy is selected based on the abnormality reason to process the abnormal subtransaction, to obtain the final processing result. In this case, in a transaction process, the server 200 may receive a transaction processing request sent by the device 300, and the server 200 divides the to-be-processed transaction based on the transaction processing request to obtain a plurality of subtransactions. Then, a subtransaction is divided into a plurality of parts based on a network interface to which the subtransaction belongs. Finally, each part is processed and the matched processing policy is selected based on the abnormality reason for the abnormal subtransaction whose processing result is abnormal, to process the abnormal subtransaction to obtain the final processing result. Therefore, this resolves a problem that overall service performance is limited by a processing capacity of a standalone database. In addition, the abnormal subtransaction is automatically processed by using the matched processing policy, thereby improving fault tolerance and a transaction processing capability.

Figure 2B:
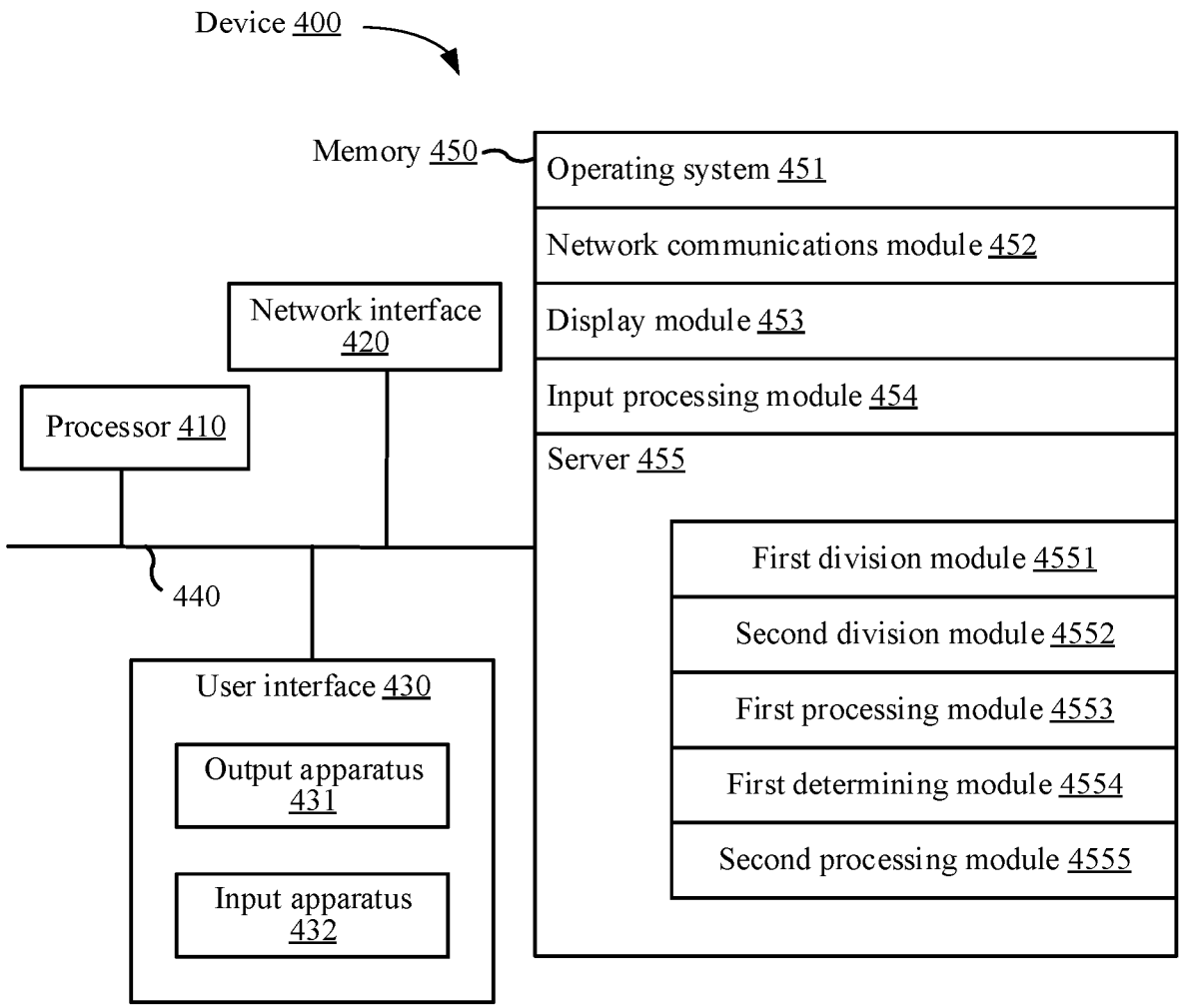
FIG. 2B is a schematic structural diagram of a transaction processing system according to an embodiment of the present disclosure.

Referring to FIG. 2B, FIG. 2B is a schematic structural diagram of a transaction processing system according to an embodiment of the present disclosure. The device 400 shown in FIG. 2B includes: at least one processor 410, a memory 450, at least one network interface 420, and a user interface 430. The components in the device 400 are coupled by using a bus system 440. It may be understood that the bus system 440 is configured to implement connection and communication between the components. In addition to a data bus, the bus system 440 further includes a power bus, a control bus, and a status signal bus. However, for ease of clear description, various buses are all marked as the bus system 440 in FIG. 2B.

The processor 410 may be an integrated circuit chip having a signal processing capability, for example, a general-purpose processor, a digital signal processor, or another programmable logic device, a discrete or transistor logic device, or a discrete hardware component, where the general-purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including a user interface component helping a user input, for example, a keyboard, a mouse, a microphone, a touch display screen, a camera, or another input button and control.

The memory 450 may be a removable memory, a non-removable memory, or a combination thereof. An exemplary hardware device includes a solid-state memory, a hard disk drive, an optical disc driver, or the like. The memory 450 optionally includes one or more storage devices physically away from the processor 410.

The memory 450 includes a volatile memory or a non-volatile memory, or may include both the volatile memory and the non-volatile memory. The non-volatile memory may be a read-only memory (ROM), and the volatile memory may be a random access memory (RAM). The memory 450 described in one embodiment of the present disclosure intends to include any memory of a suitable type.

In some embodiments, the memory 450 can store data to support various operations. Examples of the data include a program, a module, a data structure, or a subset or a superset thereof. The "module" may be implemented by using hardware (for example, a processing circuit and/or a memory), software (for example, software developed by using a programming language), or a combination thereof. The following provides descriptions by using examples.

An operating system 451 includes a system program configured to process various basic system services and perform a hardware-related task, for example, a framework layer, a core library layer, and a driver layer, and is configured to implement various basic services and process a hardware-based task.

A network communications module 452 is configured to reach another computing device through one or more (wired or wireless) network interfaces 420. Exemplary network interfaces 420 include: Bluetooth, wireless compatibility authentication, a universal serial bus (Universal Serial Bus, USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the apparatus provided in one embodiment of the present disclosure may be implemented by using software. FIG. 2B shows a transaction processing server 455 stored in the memory 450. The server 455 may be software in a form such as a program and a plug-in, and includes the following software modules: a first division module 4551, a second division module 4552, a first processing module 4553, a first determining module 4554, and a second processing module 4555. These modules are logical modules, and may be randomly combined or further divided based on a function to be performed. The following describes a function of each module.

In some other embodiments, the apparatus provided in one embodiment of the present disclosure may be implemented by using hardware. For example, the apparatus provided in one embodiment of the present disclosure may be a processor in a form of a hardware decoding processor, programmed to perform the transaction processing method provided in the embodiments of the present disclosure. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

The transaction processing method provided in the embodiments of the present disclosure is described with reference to an exemplary application and implementation of the device provided in the embodiments of the present disclosure.

Figure 3:
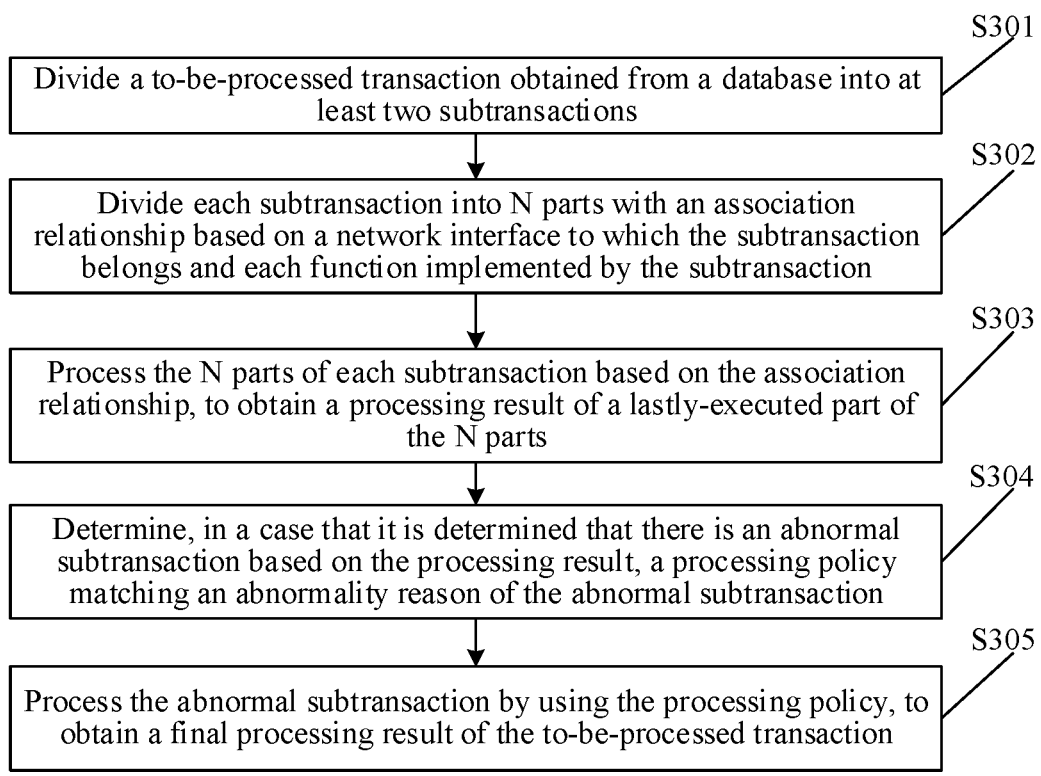
FIG. 3 is a schematic diagram of an implementation procedure of a transaction processing method according to an embodiment of the present disclosure.

Refer to FIG. 3, FIG. 3 is a schematic flowchart of an implementation of a transaction processing method according to an embodiment of the present disclosure. The method is applied to a transaction processing device, and is described with reference to steps shown in FIG. 3.

Step S301: Divide a to-be-processed transaction obtained from a database into at least two subtransactions.

In some embodiments, the to-be-processed transaction may be a long transaction, that is, a transaction that needs to be implemented across networks, for example, a Tencent charging transaction. In some embodiments, the to-be-processed transaction may be divided based on a category of a resource interface to be invoked by the to-be-processed transaction. For example, if there are three categories of resource interfaces, the to-be-processed transaction is divided into at least three subtransactions, that is, one category of resource interface corresponds to one subtransaction.

In an embodiment of the present disclosure, the to-be-processed transaction may be a transaction sent by a client and received by the transaction processing device, or a transaction read by the transaction processing device from a client or a server, for example, a game charging transaction or a billing transaction sent by the client to the transaction processing device.

Step S302: Divide each subtransaction into N parts with an association relationship based on a network interface to which the subtransaction belongs and each function implemented by the subtransaction.

In some embodiments, N is an integer greater than 1, and the network interface to which each subtransaction belongs may be understood as a network interface that needs to be invoked to implement the subtransaction. For example, three network interfaces need to be invoked, and the subtransaction is divided into three parts with an association relationship. The association relationship may be a sequence of the three parts in an execution process. For example, the subtransaction is that A and B have a call. Because three network interfaces need to be invoked in a call process, the subtransaction is divided into three parts. The three parts may be as follows: the first part is that a calling end A queries phone numbers of a called end B to prepare for the call; the second part is that the numbers found are dialed, a network connection is set up between A and B based on network communication, and the call is implemented based on the network connection; the third part is that a call result is processed.

Step S303: Process the N parts of each subtransaction based on the association relationship, to obtain a processing result of a lastly executed part of the N parts.

In some embodiments, each part is processed based on the association relationship, and finally a processing result of the lastly executed part is obtained. For example, in the call between A and B, the call result is finally obtained, and the call result is used as the processing result of the subtransaction.

Step S304: Determine, upon detecting an abnormal subtransaction based on the processing result, a processing policy matching an abnormality reason of the abnormal subtransaction.

In some embodiments, the abnormal subtransaction may be understood as a subtransaction whose processing result is inconsistent with an expected result. For example, in communication between A and B, if the finally obtained call result indicates that the call fails, it indicates that the subtransaction is an abnormal subtransaction. The processing policy matching the abnormality reason of the abnormal subtransaction may be understood as determining, based on the abnormality reason, whether to roll back data for the abnormal subtransaction or continue processing the abnormal subtransaction, to obtain the processing result of the abnormal subtransaction more accurately. In some embodiments, if the abnormality reason is that a client encounters abnormality while processing the abnormal subtransaction, a processing result of a previous subtransaction of the abnormal subtransaction is used as the processing result of the abnormal subtransaction. In a specific example, abnormality that the client encounters when the client processes the abnormal subtransaction may be that after abnormality currently occurs, execution cannot be performed again, or even if execution is performed again, abnormality still occurs. For example, if the user fails to pay due to insufficient balance of a selected bank card, payment still fails even if a transaction on the page is executed again. The transaction needs to be rolled back to a page for reselecting a payment method, so that the user can reselect another bank card. If the abnormality reason is that the server side encounters abnormality when processing the abnormal subtransaction, the N parts of the abnormal subtransaction are processed again based on the association relationship. In a specific example, abnormality that the server side encounters when the server side processes the abnormal subtransaction may be that after abnormality currently occurs, execution needs to be performed again to complete the subtransaction. For example, if delivery fails after the user pays successfully, data cannot be rolled back and delivery needs to be performed for the user again until delivery succeeds. In this way, the matched processing policy is selected based on the abnormality reason to process the abnormal subtransaction, so that the abnormal subtransaction can be automatically processed in time and a transaction processing ability is improved.

Step S305: Process the abnormal subtransaction by using the processing policy, to obtain a final processing result of the to-be-processed transaction.

In some embodiments, a correct processing result of each subtransaction is obtained, to obtain the final processing result of the to-be-processed transaction. In this way, the abnormal subtransaction is automatically processed by using the matched processing policy. This can not only ensure processing consistency between the plurality of subtransactions, but also improve fault tolerance and a transaction processing capability.

In one embodiment, a long transaction that needs to be processed is first divided into a plurality of subtransactions, the subtransaction is then divided into a plurality of parts, and each part is processed to obtain a processing result of each subtransaction. This resolves a problem that overall service performance is limited by a processing capacity of a standalone database. The matched processing policy is selected based on the abnormality reason of the abnormal processing result to process the abnormal subtransaction, to obtain the final processing result. In this way, the abnormal subtransaction is automatically processed by using the matched processing policy, thereby improving fault tolerance and a transaction processing capability.

In some embodiments, to ensure efficient processing of each part, step S302 may be implemented in the following steps:

Step S321: Determine a category set of the network interface to which the subtransaction belongs.

For example, B transfers money to A. A network interface for initiating a money transfer request by A, network interfaces of banks separately corresponding to A and B, a network interface for receiving the money transfer request and implementing money transfer by B, and the like need to be invoked.

Step S322: Divide the corresponding subtransaction into the N parts based on the category set of the network interface and each function implemented by the corresponding subtransaction.

In some embodiments, each subtransaction is divided into at least a plurality of parts based on the category set of the network interface, where a quantity of the parts is the same as that of categories in the category set. In addition, a dividing point at which the subtransaction is divided into parts is determined with reference to each function performed by a corresponding subtransaction. For example, B transfers money to A, there are three categories, and functions to be performed are committing an order, performing a money transfer operation, and notifying that money transfer succeeds. In this case, the subtransaction is divided into at least three parts. If A and B correspond to the same bank, the subtransaction may be divided into three parts. If A and B do not correspond to the same bank, the subtransaction may be divided into four parts.

Step S323: Determine an association relationship between the N parts based on each function implemented by the subtransaction, to form the N parts with the association relationship.

For example, B transfers money to A. The subtransaction is divided into three parts based on the three functions (that is, committing an order, performing a money transfer operation, and notifying that money transfer succeeds), and the association relationship among the three parts is determined.

In some embodiments, to ensure processing consistency between the plurality of subtransactions, step S303 includes the following two cases:

Case 1: Process the N parts of the subtransaction based on the association relationship when the at least two subtransactions are independent of each other, to obtain the processing result of the lastly executed part of the N parts.

In some embodiments, the at least two subtransactions are independent of each other, that is, these subtransaction have no intersection set. For example, a subtransaction is used for implementing communication, and a subtransaction is used for invoking a bank interface. A processing sequence between the subtransactions having no intersection set may not be considered, and the plurality of parts of each subtransaction are processed based on the association relationship between the parts, to obtain the processing result of the lastly executed part.

Case 2: First, determine a processing path of the at least two subtransactions based on an intersection set and a preset whitelist when the at least two subtransactions have the intersection set.

In some embodiments, for example, the to-be-processed transaction is Tencent charging. A subtransaction is product rating, a subtransaction is order payment, and a subtransaction is delivery. In this case, the three subtransactions have an intersection set, that is, product rating needs to be first performed, order payment is made based on a product rating result, and successful or failed delivery is finally implemented based on an order payment result. The preset whitelist may be considered as a proper processing path for implementing the specified transactions, for example, order payment needs to be made first before delivery. If delivery is first implemented before order payment is made, it is determined that this processing path does not satisfy the preset whitelist.

Then, sequentially process the N parts of the subtransaction based on the processing path and the association relationship, to obtain a processing result of the subtransaction.

For example, the first subtransaction that needs to be executed is first determined based on the processing path, and the plurality of parts of the first subtransaction are processed based on the association relationship, to obtain a processing result of the first subtransaction. Then, based on the processing result of the first subtransaction, the plurality of parts of the second subtransaction are processed based on the association relationship, to obtain a processing result of the second subtransaction. By analogy, all subtransactions are processed based on the processing path, to obtain the final processing result of the to-be-processed transaction. In this way, the plurality of parts obtained by dividing the plurality of subtransactions are processed, to ensure consistency between the subtransactions in real time. The whitelist mechanism is introduced, to ensure proper status transfer between the plurality of subtransactions.

In a specific example, when the category set of the network interface to which the subtransaction belongs includes M categories, the subtransaction is divided into at least M parts, M being an integer greater than 1, and step S303 may be implemented in the following steps:

Step 1: Determine a serial execution sequence between the at least M parts based on the association relationship.

For example, B transfers money to A. If the subtransaction is divided into three parts: creating a money transfer order, performing a money transfer operation, and a money transfer result, an execution sequence between the three parts is determined.

Step 2: Execute an $M^{th}$ part of the at least M parts in the serial execution sequence based on the serial execution sequence and a processing result of an $(M-1)^{th}$ part of the at least M parts in the serial execution sequence, to obtain the processing result of the lastly executed part.

For example, a money transfer order is first created to obtain a successfully created money transfer order, B then transfers money to A based on the money transfer order, and finally, it is determined whether the result succeeds or fails, to notify the user.

In one embodiment of the present disclosure, a processing procedure of a single subtransaction is implemented in the first to the fourth steps, and the plurality of parts are executed one by one based on the execution sequence between the plurality of parts, to obtain the processing result of the subtransaction, thereby accelerating transaction processing.

Figure 4:
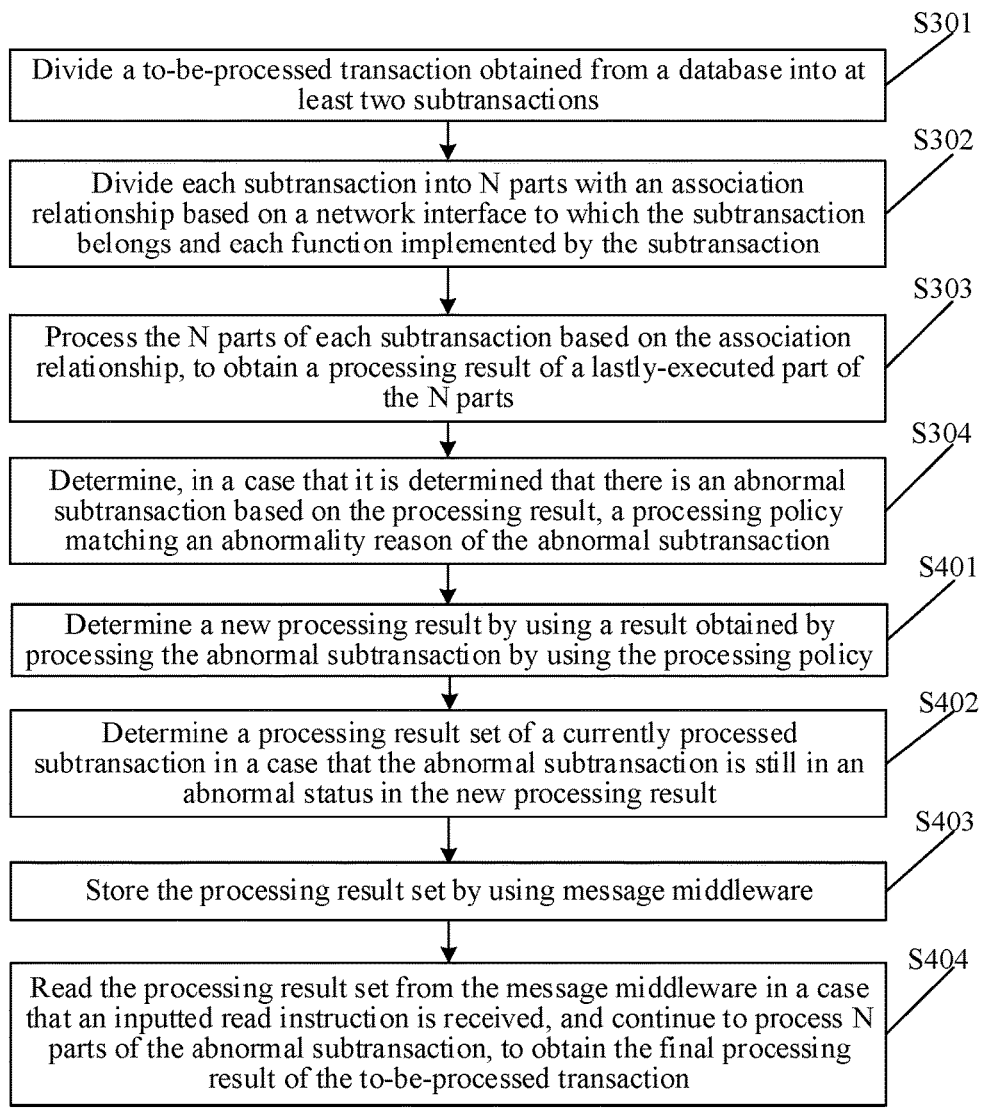
FIG. 4 is a schematic diagram of another implementation procedure of a transaction processing method according to an embodiment of the present disclosure.

In some embodiments, in a process of processing the plurality of subtransactions, for the abnormal subtransaction that encounters abnormality, a current transaction status of the to-be-processed transaction is stored in message middleware, thereby improving reliability of a data layer and ensuring that stored data is not lost. Before step S305, the method further includes the following steps. As shown in FIG. 4, FIG. 4 is a schematic flowchart of another implementation of a transaction processing method according to an embodiment of the present disclosure. The following descriptions are provided with reference to FIG. 3:

Step S401: Determine a new processing result by using a result obtained by processing the abnormal subtransaction by using the processing policy.

For example, the abnormal subtransaction is that delivery fails. In this case, the matched processing policy is that delivery continues to be performed for a user that has successfully paid, to obtain a new delivery result.

Step S402: Determine a processing result set of a currently processed subtransaction when the abnormal subtransaction is still in an abnormal status in the new processing result.

Step S403: Store the processing result set by using message middleware.

For example, if the new delivery result indicates that delivery still fails, it indicates that a current network may be faulty. In this case, to ensure that a transaction message is not lost, the processing result set of the currently processed subtransaction, that is, current transaction status information of the to-be-processed transaction, is first determined, and the current transaction status information is then stored in the message middleware, thereby improving reliability of the data layer.

Step S404: Read the processing result set from the message middleware when an inputted read instruction is received, and continue to process N parts of the abnormal subtransaction, to obtain the final processing result of the to-be-processed transaction.

In some embodiments, the receiving an inputted read instruction may be understood as that when the to-be-processed transaction needs to continue to be processed, for example, a network switches from an abnormal status to a normal status, the transaction is recovered from the message middleware by using a message subscription mechanism, and the plurality of parts of the abnormal subtransaction continue to be processed, to obtain a normal processing result.

In some embodiments, for the to-be-processed transaction having different hybrid resources, to ensure consistency between subtransactions having different resources in the to-be-processed transaction, the method is implemented in the following steps:

Step 1: Determine a resource interface set that needs to be invoked to implement the to-be-processed transaction.

In some embodiments, for example, the to-be-processed transaction is Tencent charging. The resource interface set that needs to be invoked to implement the transaction includes at least a resource interface for implementing product rating, a client resource interface for implementing order payment, a resource interface for implementing delivery, and the like.

Step 2: Divide the to-be-processed transaction into a plurality of subtransactions matching the resource interface set.

For example, Tencent charging is divided into three subtransactions matching the resource interface for implementing product rating, the client resource interface for implementing order payment, and the resource interface for implementing delivery.

Step 3: Start each resource interface in response to a received processing execution instruction.

In some embodiments, when the processing execution instruction indicating that the to-be-processed transaction needs to be processed is received, a first phase of a distributed transaction (an external XA) capability is entered, that is, each resource interface is started, to enable each resource interface get prepared for processing the subtransaction.

Step 4: Process N parts of a matched subtransaction at the resource interface based on the association relationship when preparation completion information fed back by the resource interface is received, to obtain the processing result of the lastly executed part of the N parts.

In some embodiments, after getting prepared, the resource interface feeds back the preparation completion information to the processor, the matched subtransaction is processed at the resource interface to obtain the processing result, and the second phase of the distributed transaction (an external XA) capability is then entered, that is, the processing result is committed and processing completion notification information is fed back to the user. In this way, the plurality of subtransactions are processed by using the plurality of resource interfaces, thereby ensuring consistency between different subtransactions.

The following describes an exemplary application of one embodiment of the present disclosure in an actual application scenario. An example in which a long transaction is processed in a charging scenario is used for description.

Figure 5:
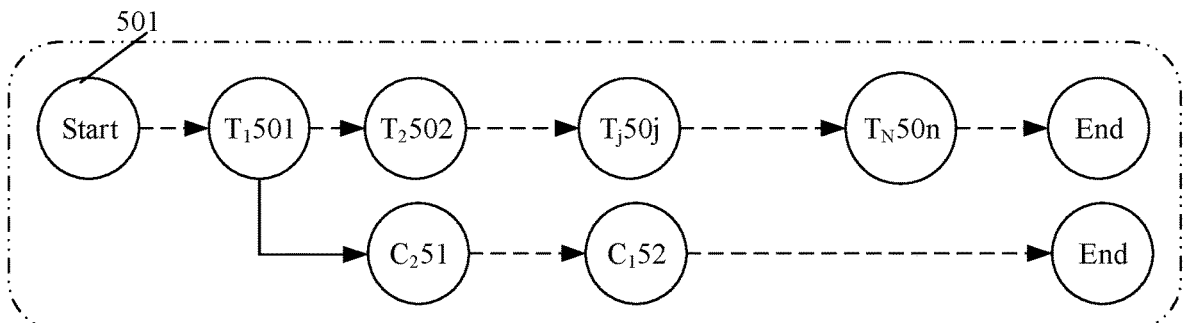
FIG. 5 is a framework diagram of a transaction processing system according to an embodiment of the present disclosure.

In some embodiments, a general transaction can be ensured by a local transaction of a database. For example, when an isolation level is repeatable read (RR) in MySQL by default, before a transaction A operates data and is committed or rolled back, another transaction cannot see data modification made by the transaction A. In a short transaction, a locking time of the database is relatively short. In a long transaction, if a transaction is not committed, a request for operating the same resource is blocked or processing expires. Therefore, it is generally improper to implement a long transaction directly by using a database transaction. In some embodiments, a long transaction is divided into a subtransaction sequence and the subtransaction sequence is sequentially performed. If execution of a subtransaction fails, a corresponding compensation transaction is executed for a previous subtransaction successfully executed. Each subtransaction is committed as a local database transaction, and another daemon service is used to ensure atomicity of the entire long transaction. In this way, a problem of low performance of a conventional long transaction based on the database is resolved while consistency of the long transaction is ensured, thereby improving overall service performance. A processing process is shown in FIG. 5. FIG. 5 is a framework diagram of a transaction processing system according to an embodiment of the present disclosure. The following descriptions are provided with reference to FIG. 5:

First, a processing procedure 51 is started to divide a long transaction into a plurality of subtransactions 501, 502, 50j, and 50n, corresponding to $T_1$ to $T_n$. $C_1 51$ and $C_2 52$ are compensation transactions corresponding to the subtransactions 501 to 50n. The plurality of subtransactions 501 to 50n are processed. If all the subtransactions 501 to 50n are successfully executed, end the procedure 52. A subtransaction unsuccessfully executed is compensated by using a compensation transaction, and when execution succeeds, end the procedure 53.

As can be seen, the following two conditions need to be met to implement the solution shown in FIG. 5:

Condition 1: A transaction attribute needs to be supported by a DBMS.

Condition 2: A long transaction can be divided into a plurality of subtransactions.

An execution process is as follows:

(1) It is assumed that a long transaction T is divided into a plurality of subtransactions $\{T_1, T_2, \ldots, T_N\}$, and each subtransaction is independent and can ensure atomicity.

(2) To ensure atomicity of the entire long transaction T, if a part of the long transaction is successfully executed, a corresponding compensation transaction $\{C_1, C_2, \ldots, C_N\}$ needs to be provided for each subtransaction. Therefore, an execution sequence of the long transaction is as follows:

normal execution sequence: $T_1, T_2, \ldots, T_j, \ldots,$ and $T_N$; and abnormal execution sequence: $T_1, T_2, \ldots, T_j, \ldots,$ $C_j, \ldots, C_2,$ and $C_1$, where $(0 \leq j \leq N)$.

(3) Execution of the subtransactions is independent of each other. In an execution process of the long transaction, there is no transaction isolation, and an intermediate transaction status may be externally read.

(4) An application starts a long transaction by using a begin transaction (begin-saga) command word and generates a unique transaction identifier (ID), defines the boundary of each subtransaction by using begin processing (begin-transaction) and end processing (end-transaction) command words, and finally completes commitment of the entire transaction by using an end transaction (end-saga) command word.

Figure 6:
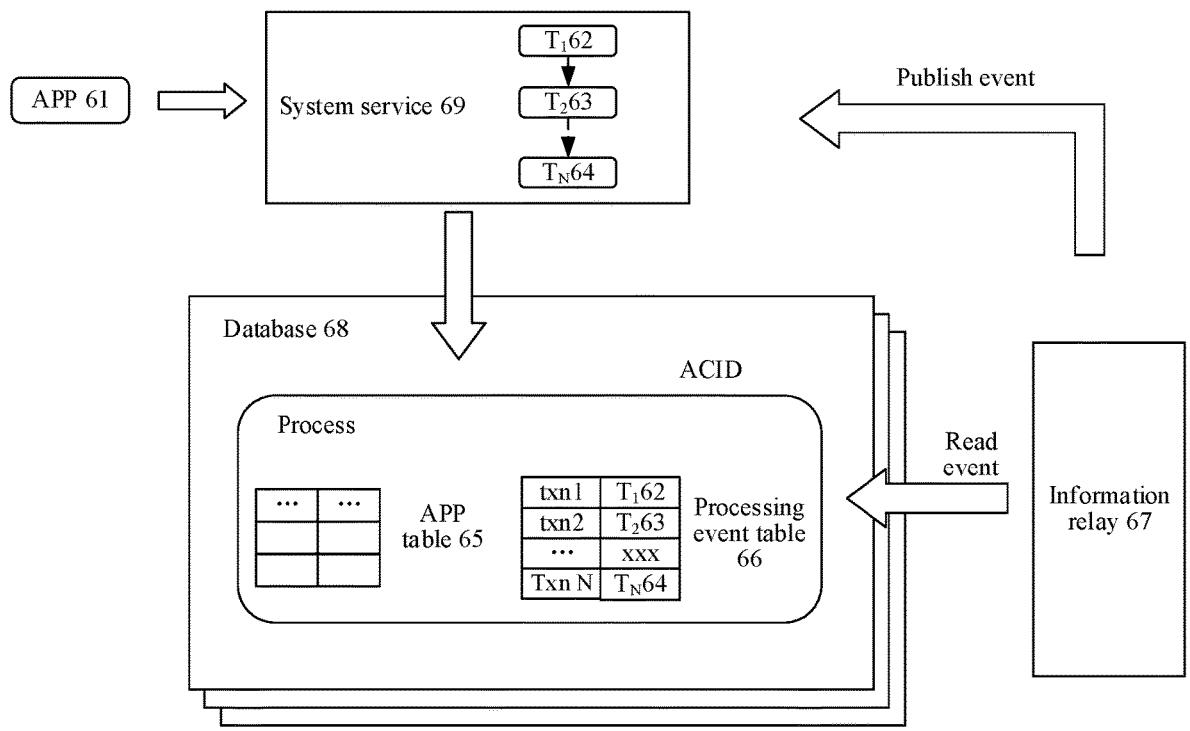
FIG. 6 is another framework diagram of processing a long transaction according to an embodiment of the present disclosure.

(5) When each subtransaction is executed, status information of a current subtransaction is committed as a local transaction of a database for storage. Different from an abnormality (for example, Crash) processing mechanism of a database transaction, when encountering abnormality, the database transaction can be automatically rolled back by using an undo log. However, in an abnormality processing mechanism, an application needs to continue to complete a subsequent subtransaction by using a message relay service saga daemon (forward recovery), or execute a compensation transaction (backward recovery), to ensure atomicity of the long transaction. As shown in FIG. 6, FIG. 6 is another framework diagram of processing a long transaction according to an embodiment of the present disclosure. The following descriptions are provided with reference to FIG. 6:

Step 1: Divide a to-be-processed transaction outputted by an application (APP) 61 into a plurality of subtransactions $T_1$62, $T_2$63, ..., and $T_N$64.

In some embodiments, the APP 61 outputs the to-be-processed transaction to a system service 69. The to-be-processed transaction is a long transaction. The plurality of subtransactions $T_1$62, $T_2$63, ..., and $T_N$64 may be independent of each other or may have a serial-connection relationship.

Step 2: Simultaneously record all service operations, to ensure consistency between two operations.

In some embodiments, because each transaction is executed based on a database, consistency between each operation and a transaction on which the operation is based needs to be ensured. An APP table 65 indicates service logic, and a processing event table 66 is configured to indicate transaction status information. An overall idea is that when a service operation needs to be performed, operations of the entire transaction are all simultaneously recorded, to ensure that both tables are either executed or fail, that is, it indicates that two operations are simultaneously valid.

Step 3: Determine a next to-be-executed subtransaction based on the table 66 after the subtransaction $T_1$62 is executed, where the message relay 67 is used to drive execution of the to-be-executed subtransaction.

In some embodiments, the message relay 67 is used to drive execution of a next subtransaction after a subtransaction is executed.

Step 4: Distribute the to-be-executed subtransaction to the system, to continue to execute the subtransaction. In some embodiments, the database 68 indicates a database storage.

As can be seen, because commitment of a subtransaction depends on a local transaction of a database, overall service performance is limited by a processing capability of a standalone database. In addition, a status of a long transaction and a service database operation need to be committed as a local database transaction. Therefore, this intrudes on a service database. Usage of some operations for which a compensation transaction cannot be provided is limited to some extent.

In one embodiment of the present disclosure, the following descriptions are provided based on an application scenario of Tencent charging. First, Tencent charging is an Internet charging platform supporting Tencent internal services with revenues worth 100 billion RMB. At such a huge service scale, Tencent charging needs to support rapid service increases, and also needs to ensure that each transaction is correct. However, a procedure of a transaction in Tencent charging usually involves network invoking for dozens of times. In a distributed scenario, to satisfy ACID, it is ensured that all operations are successfully performed before a result is committed. As a distributed scale increases, a time period for implementing consistency becomes longer. A scalability issue of a bitcoin network is used as an example. To satisfy consistency, an average confirming time of a transaction needs to be 10 minutes. Therefore, to adapt to a complex service scenario, a Base theory appears, and final consistency is used to replace strong consistency. However, as an average daily transaction volume exceeds 100 million RMB in Tencent charging, a final consistency or offline compensation solution usually causes many processing risks and complaints, and consistency needs to be implemented in real time. Therefore, an embodiment of the present disclosure provides a transaction processing method. An engine platform handles a complex problem of distributed consistency, and atomicity of a distributed transaction is mainly implemented, to ensure that a transaction is highly consistent in real time. Abnormality is automatically processed and fault tolerance is improved. Procedure management is based on a state machine and procedure controllability is improved. A long transaction is a complete transaction procedure in Tencent charging, and usually includes procedures such as user login status verification, risk control check, original article rating, marketing activity rating, user payment, article delivery, and being free of charge in promotion, and consistency in an overall procedure needs to be ensured to implement entire success or entire failure. A finite state machine (FSM) and reliable message middleware are introduced to implement a long transaction based on an application layer.

Figure 7:
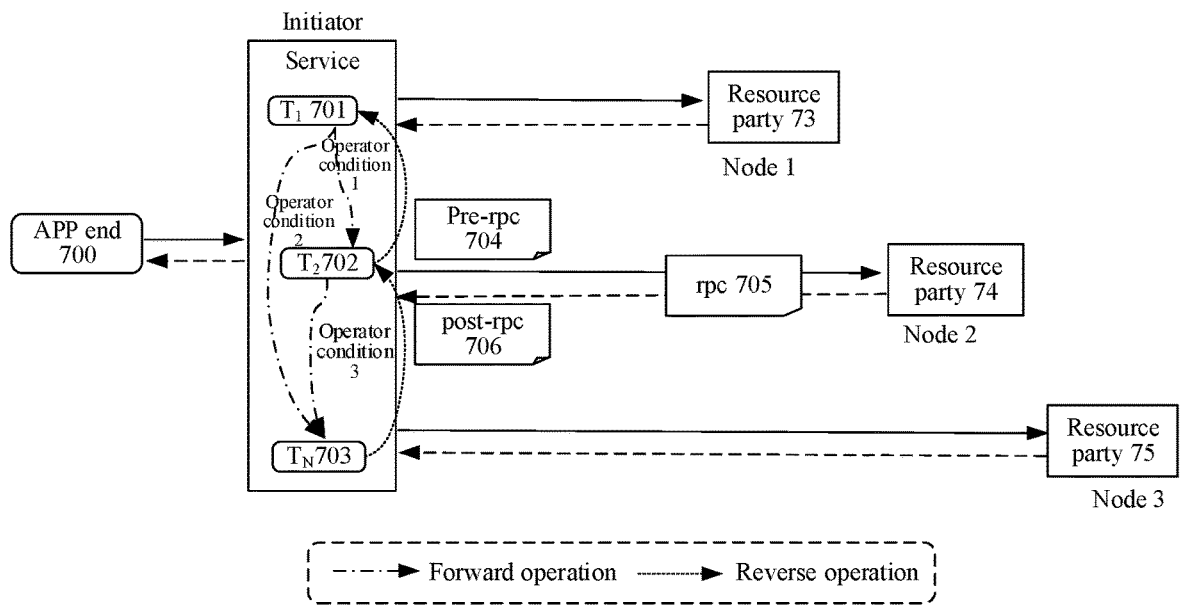
FIG. 7 is a schematic diagram of an implementation procedure of a transaction processing method according to an embodiment of the present disclosure.

FIG. 7 is a schematic flowchart of an implementation of a transaction processing method according to an embodiment of the present disclosure. The following descriptions are provided with reference to FIG. 7:

First, an initiator receives a to-be-processed transaction committed by an APP end 700, and divides the to-be-processed transaction into a plurality of subtransactions $T_1$701, $T_2$702, and $T_N$703.

In some embodiments, after determining, based on an operator condition 1, to execute the subtransaction $T_1$701, the initiator executes $T_2$702, after determining, based on an operator condition 3, to execute the subtransaction $T_1$701, the initiator executes $T_N$703, and after determining, based on an operator condition 2, to execute the subtransaction $T_2$702, the initiator executes $T_N$703. A resource party may be understood as invoking a database or a network interface. Arrows 71 and 72 each indicate that if execution of a subtransaction fails, a reverse operation is performed.

Then, start information is sent to the resource party 73, so that the resource party starts to process the subtransaction $T_1$701.

In some embodiments, a subtransaction is divided into three independent parts (that is, a prepare-remote procedure call protocol (pre-rpc) 704, an rpc 705, and a post-rpc 706). If a subtransaction encounters abnormality in a processing process, whether forward recovery or backward recovery is used in transaction recovery may be specified by a service based on result information of an rpc response by using a combination of a plurality of operator conditions.

Then, each part is executed based on the association relationship between all parts, and a processing result of the lastly executed part is fed back to the resource party 74.

Finally, that execution of the subtransaction $T_1$701 is completed is fed back to the resource party 75, and is finally fed back to the APP end 700.

Figure 8:
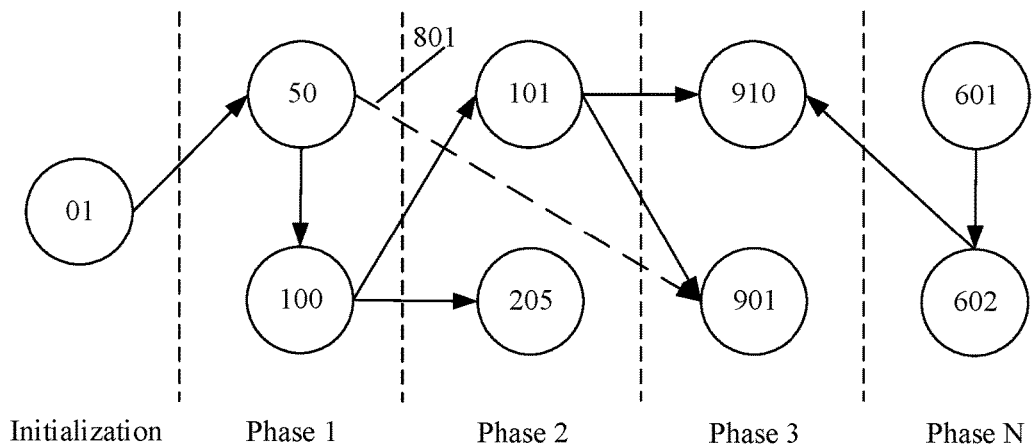
FIG. 8 is a diagram of an execution path of a procedure status of a long transaction according to an embodiment of the present disclosure.

In one embodiment of the present disclosure, an FSM whitelist mechanism is introduced to ensure proper transaction status transfer. For example, a paid order is not committed again for payment. FIG. 8 is a diagram of an execution path of a procedure status of a long transaction according to an embodiment of the present disclosure. As shown in FIG. 8, a digit in a node indicates an execution status. For example, 01 indicates initialization, 50 indicates successful rating, and 100 indicates successful ordering. In this case, after rating succeeds, ordering needs to be performed. 100 indicates that a payment is committed and indicates that a WeChat payment window is successfully invoked. For example, a pop-up window pops up in WeChat, so that a user inputs a password and the user may input or may not input the password. If the user inputs the password, payment succeeds and 101 indicating successful payment is entered. Then, 610 indicates successful delivery, 901 indicates failed delivery, 205 indicates not paid and not successful, 601 indicates that the user initiates refunding, 602 indicates that refunding to the user succeeds, and an arrow from 602 to 910 indicates that after refunding succeeds, a status of a payment note is accordingly updated and the payment note is marked as having initiated refunding. A solid-line path indicates a normal execution path, a dashed-line path 801 indicates a restricted execution path (that is, the node 50 cannot be directly transferred to the node 901, that is, rating to failed delivery is improper status transfer, and needs to pass through a payment completion status node 101). In this way, execution in the long transaction is divided into a plurality of operations, and some steps are sequential. Therefore, a status procedure needs to be controllable, and proper transfer and execution of a transaction procedure may be controlled by using a finite state machine whitelist.

Figure 9:
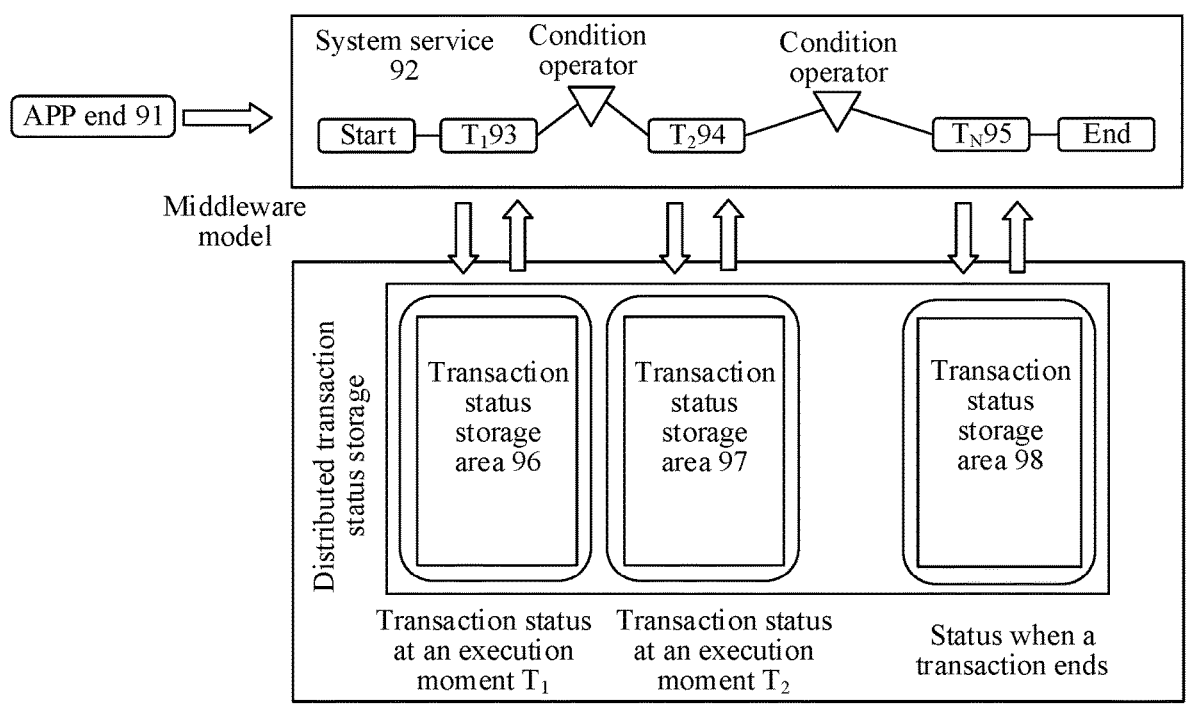
FIG. 9 is a schematic diagram of another implementation procedure of a transaction processing method according to an embodiment of the present disclosure.

In one embodiment of the present disclosure, highly-reliable message middleware (pub-sub) is used to store a transaction status, and the message subscription mechanism is used to recover a transaction. This resolves a service intrusion problem, applications to more scenarios are possible, and a flexible subscription capability is provided, so that a concurrent processing capability is higher and a delay is at a millisecond level. This is suitable for a processing scenario of an online long transaction. As shown in FIG. 9, FIG. 9 is a schematic flowchart of another implementation of a transaction processing method according to an embodiment of the present disclosure. The following descriptions are provided with reference to FIG. 9:

First, an APP end 91 commits a to-be-processed transaction to a system service 92.

Then, the system service 92 processes a subtransaction $T_1$ 93 of the to-be-processed transaction, executes a subtransaction $T_2$ 94 after determining, based on a condition operator 1, that execution of $T_1$ 93 is completed, and by analogy, sequentially executes each subtransaction until the last subtransaction $T_N$ 95 is executed, to complete processing of the to-be-processed transaction and obtain a final processing result.

In some embodiments, in a process of processing these subtransactions, a transaction status of processing the subtransaction $T_1$ 93 may be stored in a transaction status storage area 96, and a transaction status of $T_1$ 93 may be further fed back to the system service from the transaction status storage area 96. Similarly, a transaction status of processing the subtransaction $T_2$ 94 is stored in a transaction status storage area 97, and the transaction status of $T_2$ 94 may be further fed back to the system service from the transaction status storage area 97. A transaction status of processing the subtransaction $T_N$ 95 is stored in a transaction status storage area 98, and the transaction status of $T_N$ 95 may be further fed back to the system service from the transaction status storage area 98.

Figure 10:
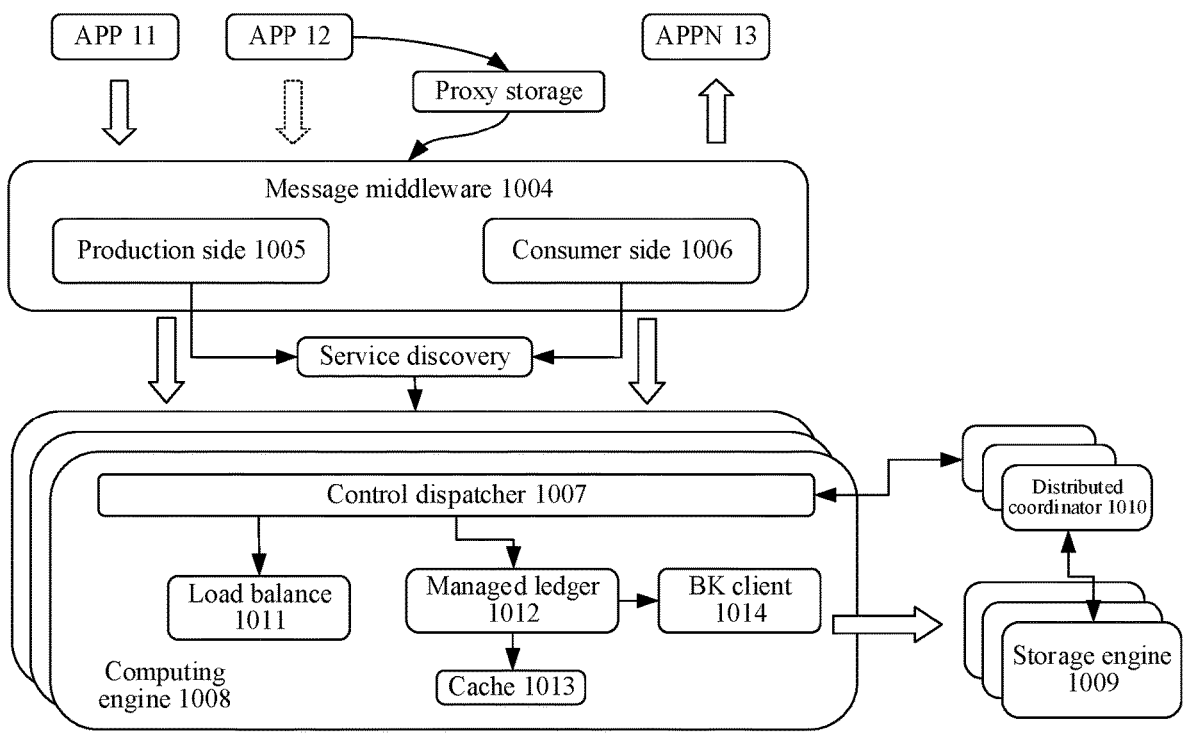
FIG. 10 is a schematic flowchart of an implementation of storing a transaction status in message middleware according to an embodiment of the present disclosure.

FIG. 10 is a schematic flowchart of an implementation of storing a transaction status in message middleware according to an embodiment of the present disclosure. As shown in FIG. 10, an APP 11, an APP 12, and an APPN 13 are separately configured to commit a to-be-processed transaction. In a specific example, if the to-be-processed transaction committed by the APP 12 encounters abnormality in a processing process, a transaction status of the to-be-processed transaction committed by the APP 12 may be stored in message middleware 1004. The message middleware 1004 includes a production side 1005 and a consumer side 1006. The production side 1005 is configured to queue a stored transaction status, and the consumer side 1006 is configured to dequeue a stored transaction status. Next, for a transaction status to be stored in the message middleware, because the emphasis is highly-reliable message middleware to ensure that a message is not lost when being stored, a control dispatcher 1007 as an underlying storage receives a request and then determines, based on the request, where to store the transaction status. The underlying storage of the control dispatcher 1007 includes a computing engine 1008 (broker), a storage engine 1009 (bookkeeper, BK), and a distributed coordinator 1010 (zookeeper). In the computing engine 1008, how to store the transaction status that is requested to be stored is determined by using load balance 1011, a managed ledger 1012, a cache 1013, and a BK client 1014. In general, the control dispatcher 1007 separates computing from storage, that is, computes to determine how and where to store the transaction status. Storage refers to highly-reliable storage of the transaction status that is ensured by the storage engine 1009.

In one embodiment, to ensure that a transaction message is not lost, highly-reliable message middleware is based on a multi-copy manner at a data layer, to ensure high reliability of the data layer. In addition, WAL is used to sequentially write logs on the production side, so that a system processing capability is improved and a delay can reach a millisecond level. Computing is separated from storage in the architecture, and horizontal extension can be flexibly performed. Finally, to facilitate management, a management platform easy for an operation is implemented, to view a transaction executed at any moment.

Figure 11:
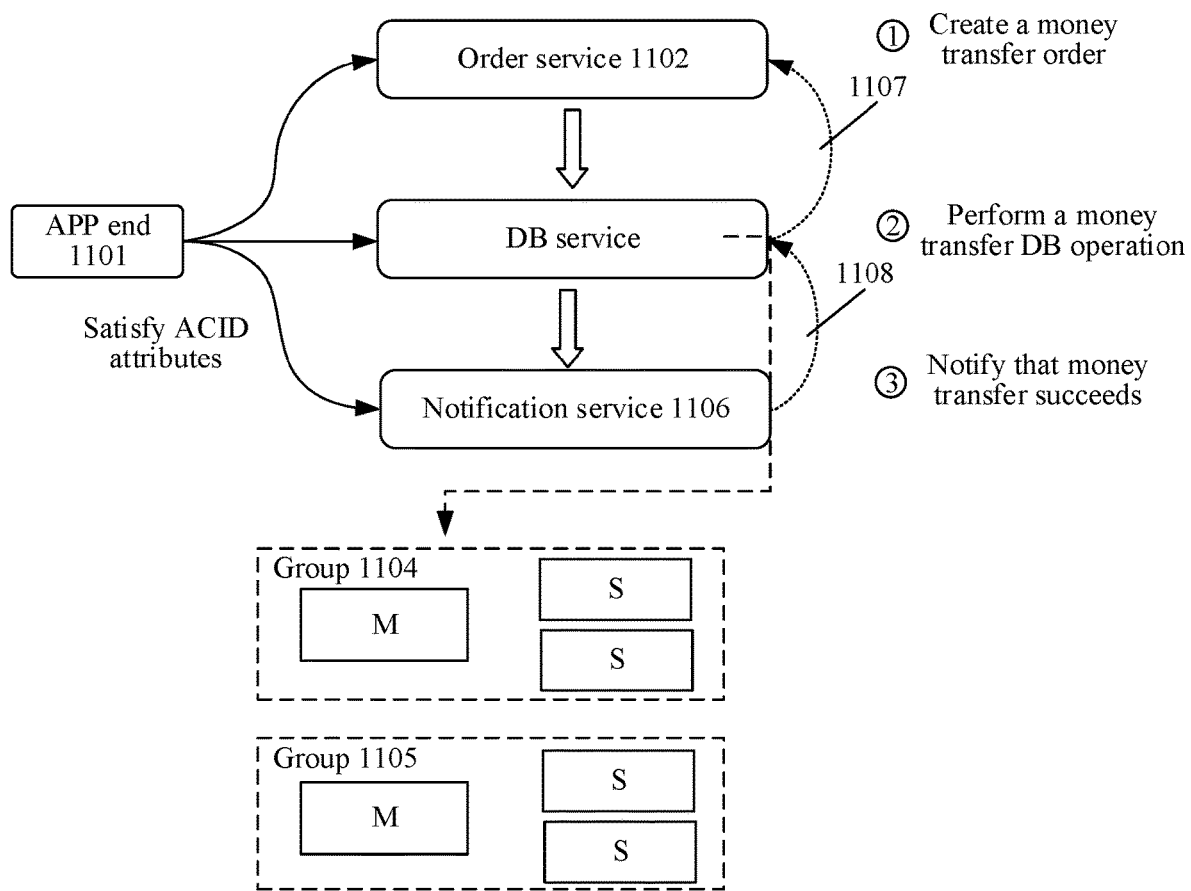
FIG. 11 is a schematic flowchart of an implementation of implementing a money transfer request according to an embodiment of the present disclosure.

In some embodiments, in an actual service scenario of Tencent charging, in a transaction processing process, an RPC interface is processed and invoked and a database or another resource interface may be further directly operated. Money transfer of a user is used as an example, and a money transfer operation procedure involves three steps in FIG. 11. FIG. 11 is a schematic flowchart of an implementation of implementing a money transfer request according to an embodiment of the present disclosure. The following descriptions are provided with reference to

FIG. 11:

Step 1: Record, in an order service 1102, a money transfer request committed by an APP end 1101, to create a money transfer order.

Step 2: After creation of the order is completed, enter a DB service 1103 to perform a money transfer DB operation and modify user DB data.

In some embodiments, when two different network interfaces need to be invoked in a process of performing a money transfer operation, this needs to be implemented by using two groups 1104 and 1105. In the groups 1104 and 1105, M and S separately indicate master and slave in settings of a database. In a specific example, a user A transfers money to a user B. However, the two users have different banks: the Construction Bank and the Industrial and Commercial Bank. Data of the two banks is not stored in the same server. In this case, the two groups 1104 and 1105 are used to implement money transfer between different banks.

Step 3: After money transfer is completed, enter a notification service 1106 to generate money transfer success information to notify a money transfer success, and return the money transfer success information to the APP end 1101.

In some embodiments, a dashed line 1107 and a dashed line 1108 separately indicate that data rollback is performed when a current step fails.

In one embodiment, read and write performance of the message middleware is higher than processing performance of the database, and a local storage and highly-consistent remote message middleware are combined to ensure that a transaction message is not lost. Status information of a long transaction is persistently stored by the message middleware and does not need to be coupled to service storage, the entire transaction is driven to execute in the pub-sub manner, and it is ensured that the database is non-intrusive.

In some embodiments, because a transaction of the database is based on a connection and the transaction is rolled back once the connection breaks, the following several scenarios are assumed:

scenario 1: If a DB transaction is first successfully committed and another transaction fails;

scenario 2: If another transaction is first successfully committed and a DB connection breaks;

scenario 3: If another transaction is first successfully committed and a part of a DB succeeds and the other part of the DB fails; and scenario 4: If there is an asynchronous service, whether to commit a DB operation.

Figure 12:
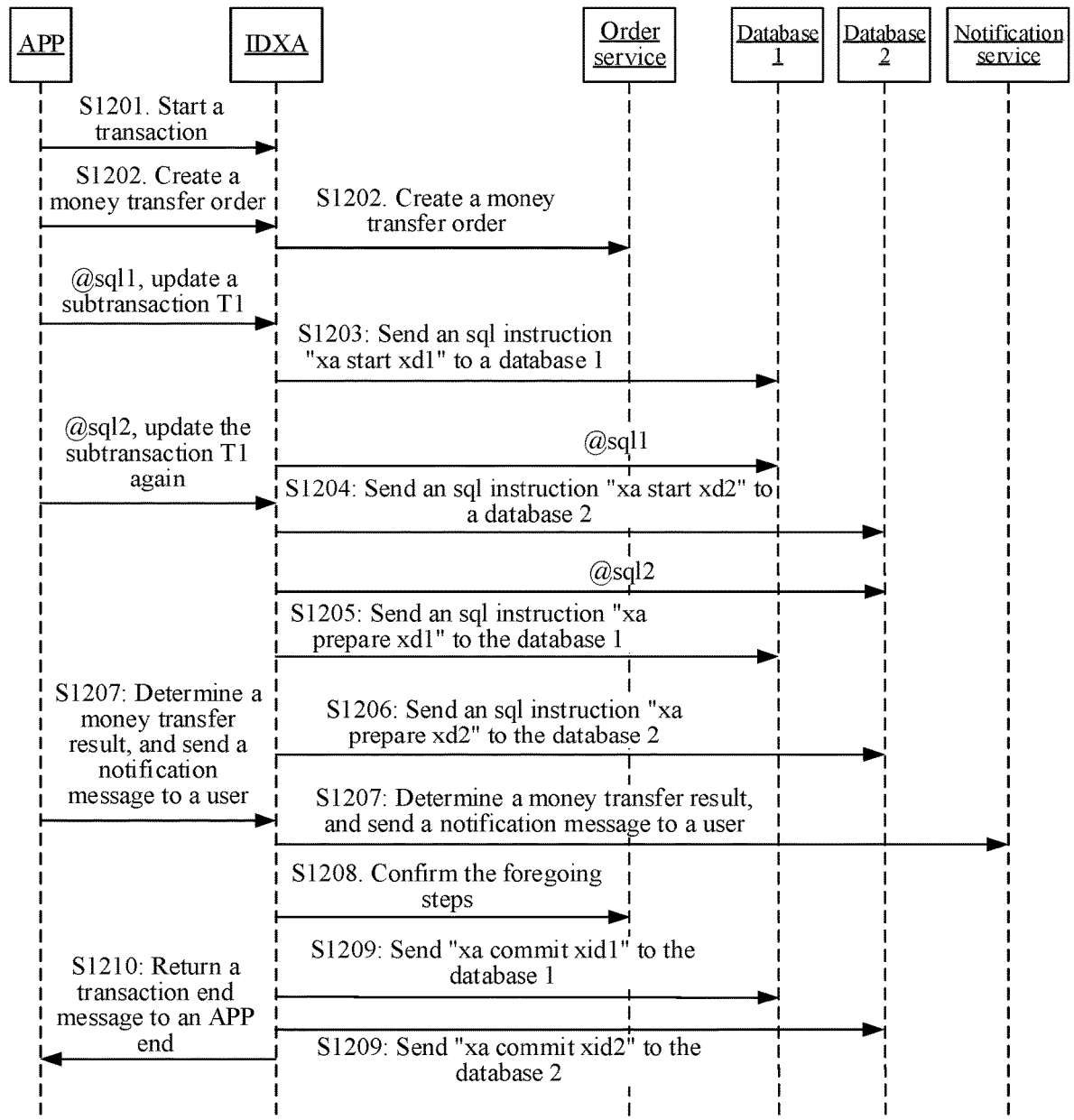
FIG. 12 is a schematic diagram of an implementation procedure of a transaction processing method according to an embodiment of the present disclosure.

As can be seen, when a long transaction involves a DB operation, it is very difficult to implement or provide a compensation transaction operation. For example, corresponding reverse operations of some complex SQL operations cannot be performed. Therefore, a long transaction cannot be consistently processed. When the foregoing four scenarios appear, a part of a subtransaction is committed and the other part of the subtransaction fails. Therefore, to resolve the foregoing problem, one embodiment of the present disclosure implements a distributed native transaction with reference to an external XA capability of MySQL. Because MySQL provides an external XA transaction capability and allows a transaction getting prepared successfully to run across connections, a cross-database distributed transaction is implemented through committing in two phases. Because a service SQL is not limited, there are more application scenarios. Money transfer is used as an example below to describe a process of ensuring consistency between different subtransactions when a long transaction involves hybrid resource operations. As shown in FIG. 12, FIG. 12 is a schematic flowchart of an implementation of a transaction processing method according to an embodiment of the present disclosure. The following descriptions are provided with reference to FIG. 12:

Step S1201. Start a transaction.

In some embodiments, an APP end sends a start transaction instruction to a middleware service engine (TDXA), the APP end initiates a money transfer request to the TDXA, and the TDXA is configured to implement a consistent middleware service engine.

Step S1202. Create a money transfer order.

In some embodiments, Try indicates creating an order. After an order service (order service) is created, an sql money transfer operation is initiated, and the first phase of the money transfer operation is entered.

Step S1203: Send an sql instruction "xa start xd1" to a database 1.

In some embodiments, sql1 may update a subtransaction T1 by using an sql statement "@sql1=update T1 set balance=balance+10 where user='g1'". sql2 may update the subtransaction T1 again by using an sql statement "@sql2=update T1 set balance=balance −10 where user='g2' and balance >=10".

Step S1204: Send an sql instruction "xa start xd2" to a database 2.

In some embodiments, the sql instructions "xa start xd1" and "xa start xd2" are respectively sent to the database 1 and the database 2 (where the two sql instructions serve as coordinators to ensure that the two databases reach consensus, so that both the database 1 and the database 2 get prepared), to ensure consistency between the database 1 and the database 2 in processing a transaction.

Step S1205: Send an sql instruction "xa prepare xd1" to the database 1.

Step S1206: Send an sql instruction "xa prepare xd2" to the database 2.

In some embodiments, the sql instructions "xa prepare xd1" and "xa prepare xd2" are respectively sent to the database 1 and the database 2, so that both the DBs get prepared, to process the transaction, that is, process a money transfer order.

Step S1207: Determine a money transfer result, and send a notification message to a user.

In some embodiments, "do" may be used to obtain a money transfer result. If an order service fails in a process of creating a money transfer order, a status of the created order is set again. For example, when creation of the order is completed, the status is set to 1. If the order service fails, the status of the order is modified. Do is used to notify the user whether money transfer fails or succeeds. In one embodiment, if the order is successfully created, but the money transfer result is failure, the status of the created order is modified to an invalid order. After step S1207 is performed, enter the second phase of a status of a plurality of transactions.

In another embodiment, in a process of processing a database transaction, in a scenario requiring rollback, a reverse operation is performed by using "undo log" records in sql (for example, a reverse operation of a=a+1 is a=a−1). The database is used as a storage medium. In addition, a local file may be alternatively used as a storage. For example, status information of each subtransaction is stored based on a row, and then, transaction status information in an asynchronous delivery check file is used to determine a subsequent operation.

Step S1208. Confirm the foregoing steps.

In some embodiments, in the second phase of the status of the plurality of transactions, a protocol that has been agreed on in the foregoing step S1201 to step S1207 is confirmed.

Step S1209: Send "xa commit xid1" to the database 1 and send "xa commit xid2" to the database 2.

In some embodiments, "xa commit xid1" and "xa commit xid2" are respectively sent to the database 1 and the database 2, to ensure that the database 1 and the database 2 commit a final processing result (for example, money transfer succeeds) and have fed back the final processing result to an APP end.

Step S1210: Return a transaction end message to the APP end.

In one embodiment of the present disclosure, transaction types of a plurality of different resources are supported, and there are more application scenarios. A procedure of a long transaction may involve a plurality of resource operations such as an RPC database and a KV, and consistency between hybrid resource operations needs to be ensured, thereby implementing universality.

The following continues to describe an exemplary structure of a transaction processing server 455 implemented as a software module according to an embodiment of the present disclosure. In some embodiments, as shown in FIG. 2B, the software module of the transaction processing server 455 stored in the memory 450 may include: a first division module 4551, configured to divide a to-be-processed transaction obtained from a database into at least two subtransactions; a second division module 4552, configured to divide each subtransaction into N parts with an association relationship based on a network interface to which the subtransaction belongs and each function implemented by the subtransaction, N being an integer greater than 1; a first processing module 4553, configured to process the N parts of each subtransaction based on the association relationship, to obtain a processing result of a lastly executed part of the N parts; a first determining module 4554, configured to determine, upon detecting an abnormal subtransaction based on the processing result, a processing policy matching an abnormality reason of the abnormal subtransaction; and a second processing module 4555, configured to process the abnormal subtransaction by using the processing policy, to obtain a final processing result of the to-be-processed transaction. determine a category set of the network interface to which the subtransaction belongs; divide the corresponding subtransaction into the N parts based on the category set of the network interface and each function implemented by the corresponding subtransaction; and determine the association relationship between the N parts based on each function implemented by the subtransaction, to form the N parts with the association relationship. In some embodiments, the first processing module 4553 is further configured to: process the N parts of the subtransaction based on the association relationship when the at least two subtransactions are independent of each other, to obtain the processing result of the lastly executed part of the N parts. In some embodiments, the first processing module 4553 is further configured to: determine a processing path of the at least two subtransactions based on an intersection set and a preset whitelist when the at least two subtransactions have the intersection set; and sequentially process the N parts of the subtransaction based on the processing path and the association relationship, to obtain a processing result of the subtransaction. In some embodiments, when the category set of the network interface to which the subtransaction belongs includes M categories, the subtransaction is divided into at least M parts, M being an integer greater than 1, and the first processing module 4553 is further configured to: determine a serial execution sequence between the at least M parts based on the association relationship; and execute an $M^{th}$ part of the at least M parts in the serial execution sequence based on the serial execution sequence and a processing result of an $(M-1)^{th}$ part of the at least M parts in the serial execution sequence, to obtain the processing result of the lastly executed part. In some embodiments, the first processing module 4553 is further configured to: determine a new processing result by using a result obtained by processing the abnormal subtransaction by using the processing policy; determine a processing result set of a currently processed subtransaction when the abnormal subtransaction is still in an abnormal status in the new processing result; store the processing result set by using message middleware; and read the processing result set from the message middleware when an inputted read instruction is received, and continue to process N parts of the abnormal subtransaction. In some embodiments, the second processing module 4555 is further configured to: use a processing result of a previous subtransaction of the abnormal subtransaction as a processing result of the abnormal subtransaction when the abnormality reason is that abnormality occurs in a client during processing of the abnormal subtransaction; and process the N parts of the abnormal subtransaction again based on the association relationship when the abnormality reason is that abnormality occurs on a server side during processing of the abnormal subtransaction. In some embodiments, the first division module 4551 is further configured to: determine a resource interface set that needs to be invoked to implement the to-be-processed transaction; divide the to-be-processed transaction into a plurality of subtransactions matching the resource interface set; correspondingly, start each resource interface in response to a received processing execution instruction; and process N parts of a matched subtransaction at the resource interface based on the association relationship when preparation completion information fed back by the resource interface is received, to obtain the processing result of the lastly executed part of the N parts.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

An embodiment of the present disclosure provides a storage medium storing an executable instruction. When the executable instruction is executed by a processor, the processor is caused to perform the method provided in the embodiments of the present disclosure. In some embodiments, the storage medium may be a memory such as a flash memory, a magnetic surface memory, an optical disk, or an optical disk memory; or may be various devices including one or any combination of the foregoing memories. In some embodiments, the executable instruction may be compiled in a form of a program, software, a software module, a script or code, and compiled in any form of programming language (including a compiled or interpreted language, or a declarative or procedural language), and may be deployed in any form, including being deployed as an independent program or a module, a component, a subroutine or any other unit suitable for being used in a computing environment. For example, the executable instruction may correspond to, but does not necessarily correspond to a file in a file system, and may be stored in a part of a file that stores other programs or data, for example, stored in one or more scripts in a hypertext markup language (HTML) document, stored in a single file dedicated to the program discussed, or stored in a plurality of collaborative files (for example, files that store one or more modules, subroutines, or code parts). For example, the executable instruction may be deployed to execute on an in-vehicle computing device, or on a plurality of computing devices located at one location, or on a plurality of computing devices distributed in a plurality of locations and interconnected through a communication network. In conclusion, in a process of processing a long transaction in the embodiments of the present disclosure, for a to-be-processed transaction, a subtransaction is divided into a plurality of parts based on a network interface to which the subtransaction belongs, and each part is processed. A problem that overall service performance is limited by a processing capacity of a standalone database is resolved. For an abnormal subtransaction with an abnormal processing result, a matched processing policy is selected based on an abnormality reason to process the abnormal subtransaction to obtain a final processing result. In this way, the abnormal subtransaction is automatically processed by using the matched processing policy, thereby improving fault tolerance and a transaction processing ability. The foregoing descriptions are merely embodiments of the present disclosure, but are not intended to limit the protection scope of the present disclosure. Any modification, equivalent replacement, or improvement made within the spirit and scope of the present disclosure shall fall within the protection scope of the present disclosure.

In the embodiments of the present disclosure, a to-be-processed transaction obtained from a database is divided into at least two subtransactions; each subtransaction is divided into N parts with an association relationship based on a network interface to which the subtransaction belongs and each function implemented by the subtransaction; the N parts of each subtransaction is processed based on the association relationship, to obtain a processing result of a lastly executed part of the N parts; a processing policy matching an abnormality reason of the abnormal subtransaction is determined upon detecting an abnormal subtransaction based on the processing result; and the abnormal subtransaction is processed by using the processing policy, to obtain a final processing result of the to-be-processed transaction. In this way, automatic deployment is performed, and the abnormal subtransaction is processed by using the matched processing policy, thereby improving fault tolerance and a transaction processing capability.

What is claimed is:

1. A transaction processing method, applied to a computing device, the method comprising:
   dividing a to-be-processed transaction obtained from a database into at least two subtransactions including a first subtransaction, a second subtransaction, and a third subtransaction, wherein:
      in a forward operation, two forward execution paths proceed from the first subtransaction respectively to the second subtransaction and the third subtransaction; and
      in a reverse operation, a reverse execution path returns from the third subtransaction back to second subtraction, while leaving the third subtransaction present in relation to the first subtransaction;
   dividing the first or the second or the third subtransaction into N parts with an association relationship, N being an integer greater than 1;
   processing the N parts of the first or the second or the third subtransaction based on the association relationship, to obtain a processing result;
   determining, upon detecting an abnormal subtransaction based on the processing result, a processing policy; and
   processing the abnormal subtransaction by using the processing policy, to obtain a final processing result of the to-be-processed transaction.

2. The method according to claim 1, wherein the dividing the first or the second or the third subtransaction into N parts comprises:
   determining a category set of a network interface to which the first or the second or the third subtransaction belongs; and
   dividing the the first or the second or the third subtransaction into the N parts based on the category set of the network interface.

3. The method according to claim 1, wherein
   the first, the second, and third subtransactions are independent of each other.

4. The method according to claim 1, wherein the processing the N parts of the first or the second or the third subtransaction comprises:
   determining a processing path of the at least two subtransactions; and
   processing the N parts of the first or the second or the third subtransaction based on the processing path and the association relationship, to obtain the processing result of the subtransaction.

5. The method according to claim 2, wherein when the category set of the network interface includes M categories, the first or the second or the third subtransaction is divided into at least M parts, M being an integer greater than 1, and the processing the N parts of first or the second or the third subtransaction comprises:
   determining a serial execution sequence between the at least M parts based on the association relationship; and
   executing an $M^{th}$ part of the at least M parts in the serial execution sequence based on the serial execution sequence and a processing result of an $(M-1)^{th}$ part of the at least M parts in the serial execution sequence, to obtain the processing result.

6. The method according to claim 1, further comprising:
   determining a new processing result of processing the abnormal subtransaction by using the processing policy;
   determining a processing result set of a currently processed subtransaction when the abnormal subtransaction is still in an abnormal status in the new processing result;
   storing the processing result set through a message middleware; and
   reading the processing result set from the message middleware when an inputted read instruction is received.

7. The method according to claim 1, wherein the determining the processing policy comprises:
   using a processing result of a previous subtransaction of the abnormal subtransaction as a processing result of the abnormal subtransaction when abnormality occurs at a client side during processing of the abnormal subtransaction; and
   processing N parts of the abnormal subtransaction based on the association relationship when the abnormality occurs at a server side during processing of the abnormal subtransaction.

8. The method according to claim 1, wherein the dividing the to-be-processed transaction into the at least two subtransactions comprises:
   determining a resource interface set to implement the to-be-processed transaction;
   dividing the to-be-processed transaction into the at least two subtransactions according to the resource interface set.

9. A transaction processing device, comprising: a memory, configured to store an executable instruction; and a processor, configured to execute the executable instruction to perform:
   dividing a to-be-processed transaction obtained from a database into at least two subtransactions including a first subtransaction, a second subtransaction, and a third subtransaction, wherein:
      in a forward operation, two forward execution paths proceed from the first subtransaction respectively to the second subtransaction and the third subtransaction; and
      in a reverse operation, a reverse execution path returns from the third subtransaction back to second subtraction, while leaving the third subtransaction present in relation to the first subtransaction;
   dividing the first or the second or the third subtransaction into N parts with an association relationship, N being an integer greater than 1;
   processing the N parts of the first or the second or the third subtransaction based on the association relationship, to obtain a processing result;

determining, upon detecting an abnormal subtransaction based on the processing result, a processing policy; and processing the abnormal subtransaction by using the processing policy, to obtain a final processing result of the to-be-processed transaction.

10. The device according to claim 9, wherein the dividing the first or the second or the third subtransaction into N parts comprises:

determining a category set of a network interface to which the first or the second or the third subtransaction belongs; and dividing the the first or the second or the third subtransaction into the N parts based on the category set of the network interface.

11. The device according to claim 9, wherein the first, the second, and third subtransactions are independent of each other.

12. The device according to claim 9, wherein the processing the N parts of the first or the second or the third subtransaction comprises:

determining a processing path of the at least two subtransactions; and processing the N parts of the first or the second or the third subtransaction based on the processing path and the association relationship, to obtain the processing result of the subtransaction.

13. The device according to claim 10, wherein when the category set of the network interface includes M categories, the first or the second or the third subtransaction is divided into at least M parts, M being an integer greater than 1, and the processing the N parts of first or the second or the third subtransaction comprises:

determining a serial execution sequence between the at least M parts based on the association relationship; and executing an $M^{th}$ part of the at least M parts in the serial execution sequence based on the serial execution sequence and a processing result of an $(M-1)^{th}$ part of the at least M parts in the serial execution sequence, to obtain the processing result.

14. The device according to claim 9, further comprising:

determining a new processing result of processing the abnormal subtransaction by using the processing policy;

determining a processing result set of a currently processed subtransaction when the abnormal subtransaction is still in an abnormal status in the new processing result;

storing the processing result set through a message middleware; and reading the processing result set from the message middleware when an inputted read instruction is received.

15. The device according to claim 9, wherein the determining the processing policy comprises:

using a processing result of a previous subtransaction of the abnormal subtransaction as a processing result of the abnormal subtransaction when abnormality occurs at a client side during processing of the abnormal subtransaction; and processing N parts of the abnormal subtransaction based on the association relationship when the abnormality occurs at a server side during processing of the abnormal subtransaction.

16. The device according to claim 9, wherein the dividing the to-be-processed transaction into the at least two subtransactions comprises:

determining a resource interface set to implement the to-be-processed transaction;

dividing the to-be-processed transaction into the at least two subtransactions according to the resource interface set.

17. A non-transitory storage medium, storing an executable instruction that when being executed, cause a processor to perform:

dividing a to-be-processed transaction obtained from a database into at least two subtransactions including a first subtransaction, a second subtransaction, and a third subtransaction, wherein:

in a forward operation, two forward execution paths proceed from the first subtransaction respectively to the second subtransaction and the third subtransaction; and in a reverse operation, a reverse execution path returns from the third subtransaction back to second subtraction, while leaving the third subtransaction present in relation to the first subtransaction;

dividing the first or the second or the third subtransaction into N parts with an association relationship, N being an integer greater than 1;

processing the N parts of the first or the second or the third subtransaction based on the association relationship, to obtain a processing result;

determining, upon detecting an abnormal subtransaction based on the processing result, a processing policy; and processing the abnormal subtransaction by using the processing policy, to obtain a final processing result of the to-be-processed transaction.

18. The storage medium according to claim 17, wherein the dividing the first or the second or the third subtransaction into N parts comprises:

determining a category set of a network interface to which the first or the second or the third subtransaction belongs; and dividing the the first or the second or the third subtransaction into the N parts based on the category set of the network interface.

19. The storage medium according to claim 17, wherein the first, the second, and the third subtransactions are independent of each other.

20. The storage medium according to claim 17, wherein the processing the N parts of the first or the second or the third subtransaction comprises:

determining a processing path of the at least two subtransactions; and processing the N parts of the first or the second or the third subtransaction based on the processing path and the association relationship, to obtain the processing result of the subtransaction.

* * * * *